(12) United States Patent
Narain et al.

(10) Patent No.: US 9,971,327 B2
(45) Date of Patent: May 15, 2018

(54) BUILDING MANAGEMENT SYSTEM WITH NFC TAGS FOR MONITORING AND CONTROLLING BUILDING EQUIPMENT

(71) Applicant: Johnson Controls Technology Company, Holland, MI (US)

(72) Inventors: Vivek Narain, Greater Noida (IN); Mohit Goel, Kaithal (IN)

(73) Assignee: Johnson Controls Technology Company, Auburn Hills, MI (US)

( * ) Notice: Subject to any disclaimer, the term of this patent is extended or adjusted under 35 U.S.C. 154(b) by 237 days.

(21) Appl. No.: 14/863,219

(22) Filed: Sep. 23, 2015

(65) Prior Publication Data
US 2017/0082993 A1 Mar. 23, 2017

(51) Int. Cl.
*G05B 19/042* (2006.01)
*H04B 5/00* (2006.01)
*H04W 4/04* (2009.01)

(52) U.S. Cl.
CPC ......... *G05B 19/042* (2013.01); *H04B 5/0031* (2013.01); *H04B 5/0056* (2013.01); *H04W 4/04* (2013.01); *G05B 2219/2642* (2013.01)

(58) Field of Classification Search
CPC .......... G05B 19/042; G05B 2219/2642; H04B 5/0031; H04B 5/0056; H04W 4/04
See application file for complete search history.

(56) References Cited

U.S. PATENT DOCUMENTS

| 2011/0181399 | A1* | 7/2011 | Pollack | G06K 19/0717 340/10.33 |
| 2014/0070919 | A1* | 3/2014 | Jackson | G08C 17/02 340/5.61 |
| 2015/0102914 | A1* | 4/2015 | Park | G06K 7/10237 340/10.6 |
| 2015/0116093 | A1* | 4/2015 | Swager | G06K 19/0717 340/10.4 |

OTHER PUBLICATIONS

Texas Instruments Incorporated, RF430FRL15xH NFC ISO 15693 Sensor Transponder, Nov. 2012-Revised Dec. 2014, 51 pages.

* cited by examiner

*Primary Examiner* — Yuhui R Pan
(74) *Attorney, Agent, or Firm* — Foley & Lardner LLP

(57) ABSTRACT

A system for monitoring and controlling building equipment includes a near field communications (NFC) tag, a temperature sensor, a mobile device, and a controller. The NFC tag is located within a building space and stores a tag ID uniquely identifying the NFC tag. The temperature sensor is associated with the building space and configured to measure a temperature of the building space. The mobile device reads the NFC tag and obtains the tag ID from the NFC tag via NFC. The controller receives the tag ID from the mobile device and uses the tag ID to identify the temperature sensor associated with the building space. The controller receives the measured temperature from the temperature sensor and provides the measured temperature to the mobile device. The mobile device displays the measured temperature via a user interface of the mobile device.

11 Claims, 14 Drawing Sheets

User enters new data via moblie device

Mobile device prompts user to scan NFC tag

BUILDING MANAGEMENT SYSTEM WITH NFC TAGS FOR MONITORING AND CONTROLLING BUILDING EQUIPMENT

BACKGROUND

The present invention relates generally to building management systems and more particularly to a building management system that uses near field communications (NFC) tags to facilitate monitoring and controlling building equipment.

A building management system (BMS) is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

Conventional BMSs use input from thermostats to measure the temperature of building spaces and to define temperature setpoints for the building spaces. The thermostats are typically mounted on walls within the building spaces. Each thermostat may include a temperature sensor and a user interface. The user interface typically includes an electronic display for presenting information to a user and one or more physical input devices (e.g., a rotary knob, pushbuttons, manually-operable switches, etc.) for receiving input from a user. The temperature sensor measures the temperature of the building space and provides the measured temperature to the user interface. To monitor the temperature of the building space, a user is required to move to the location of thermostat and view the measured temperature via the thermostat's user interface. To control the temperature of the building space, the user adjusts the temperature setpoint via the thermostat's user interface.

SUMMARY

One implementation of the present disclosure is a system for monitoring and controlling building equipment. The system includes a near field communications (NFC) tag located within a building space and storing a tag ID uniquely identifying the NFC tag. The system includes a temperature sensor associated with the building space and configured to measure a temperature of the building space. The temperature measured by the temperature sensor defines a zone temperature. The system includes a mobile device configured to communicate with the NFC tag. The mobile device reads the NFC tag and obtains the tag ID from the NFC tag via NFC. The system includes a controller in communication with the mobile device. The controller receives the tag ID from the mobile device and uses the tag ID to identify the temperature sensor associated with the building space. The controller receives the zone temperature from the temperature sensor and provides the zone temperature to the mobile device. The mobile device displays the zone temperature via a user interface of the mobile device.

In some embodiments, the system includes a control application running on the mobile device. The control application may display the zone temperature and may allow a user to adjust a setpoint for the zone temperature via the user interface of the mobile device. The mobile device may send the adjusted setpoint to the controller. The controller may use the adjusted setpoint to control building equipment associated with the building space. In some embodiments, the NFC tag stores a location of the control application and the mobile device obtains the location of the control location from the NFC tag via NFC. The mobile device may use the location of the control application to download and install the control application. The control application may configure the mobile device to communicate with the controller.

In some embodiments, the system includes a locations database storing an association between the tag ID and the building space in which the NFC tag is located. The controller may use the stored association between the tag ID and the building space to determine that the mobile device is located within the building space. In some embodiments, the locations database stores an association between the building space and the temperature sensor. The controller may use the stored association between the building space and the temperature sensor to identify the temperature sensor associated with the building space.

In some embodiments, the NFC tag includes an integrated temperature sensor configured to measure a temperature of the building space at a location of the NFC tag. The temperature measured by the integrated temperature sensor may define a tag temperature. In some embodiments, the NFC tag is a passive NFC tag that becomes energized by the mobile device when the mobile device reads the NFC tag. The integrated temperature sensor may measure the tag temperature in response to the NFC tag becoming energized by the mobile device. In some embodiments, the NFC tag provides the tag temperature to the mobile device via NFC when the mobile device reads the NFC tag. The mobile device may display the tag temperature via the user interface of the mobile device. In some embodiments, the mobile device sends the tag temperature to the controller and the controller uses the tag temperature to control building equipment associated with the building space.

In some embodiments, the NFC tag includes one or more integrated sensors including at least one of a temperature sensor, a humidity sensor, an oxygen sensor, a pressure sensor, and an accelerometer. The NFC tag may use the one or more integrated sensors to measure at least one or a temperature, a humidity, an oxygen level, a pressure, and an acceleration at a location of the NFC tag when the NFC tag is energized by the mobile device.

In some embodiments, the NFC tag is located within a wall of the building space and includes an integrated humidity sensor configured to measure a humidity within the wall when the NFC tag is energized by the mobile device. The NFC tag may provide the measured humidity to the mobile device via NFC when the mobile device reads the NFC tag.

Another implementation of the present disclosure is a system for monitoring and controlling building equipment. The system includes a controller for the building equipment, a near field communications (NFC) tag, and a mobile device. The NFC tag is located within a building space and stores a location of a control application. The mobile device is configured to communicate with the NFC tag. The mobile device reads the NFC tag and obtains the location of the control application from the NFC tag via NFC. The mobile device uses the location of the control application to download and install the control application. The control application configures the mobile device to communicate with the controller.

In some embodiments, the mobile device uses the control application to adjust a setpoint for the controller. The controller may use the adjusted setpoint to control building equipment associated with the building space.

In some embodiments, the NFC tag is configured to communicate using a first NFC protocol (e.g., the NFC data exchange format) and a second NFC protocol (e.g., the ISO 15693 protocol). The mobile device may obtain the location of the control application from the NFC tag using the first NFC protocol. The control application may configure the mobile device to communicate with the NFC tag using the second NFC protocol. The NFC tag may store additional information and provide the additional information to the mobile device when the mobile device reads the NFC tag using the second NFC protocol.

In some embodiments, the additional information includes a tag ID uniquely identifying the NFC tag. The controller may receive the tag ID from the mobile device and use the tag ID to identify a temperature sensor associated with the building space. The controller may receive a measured temperature of the building space from the temperature sensor and may provide the measured temperature of the building space to the mobile device.

In some embodiments, the NFC tag includes an integrated temperature sensor configured to measure a temperature of the building space at a location of the NFC tag. The temperature measured by the integrated temperature sensor defines a tag temperature. In some embodiments, wherein the additional information includes the tag temperature. In some embodiments, the mobile device sends the tag temperature to the controller. The controller may use the tag temperature to control building equipment associated with the building space.

Another implementation of the present disclosure is a system for monitoring and controlling building equipment. The system includes a controller for the building equipment, a near field communications (NFC) tag, and a mobile device. The NFC tag is located within a building space and stores access credentials for connecting to a wireless network. The mobile device is configured to communicate with the NFC tag. The mobile device reads the NFC tag and obtains the access credentials from the NFC tag via NFC. The mobile device uses the access credentials to connect to the wireless network and provides an adjusted setpoint to the controller via the wireless network. The controller uses the adjusted setpoint to control building equipment associated with the building space.

In some embodiments, the NFC tag stores a tag ID uniquely identifying the NFC tag and provides the tag ID to the mobile device when the mobile device reads the NFC tag. The controller may receive the tag ID from the mobile device and may use the tag ID to identify a temperature sensor associated with the building space. The controller may receive a measured temperature of the building space from the temperature sensor and may provide the measured temperature of the building space to the mobile device.

In some embodiments, the NFC tag includes an integrated temperature sensor configured to measure a temperature of the building space at a location of the NFC tag. The temperature measured by the integrated temperature sensor defines a tag temperature. The NFC tag may provide the tag temperature to the mobile device when the mobile device reads the NFC tag. The mobile device may send the tag temperature to the controller. The controller may use the tag temperature to control the building equipment associated with the building space.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Figure 1:
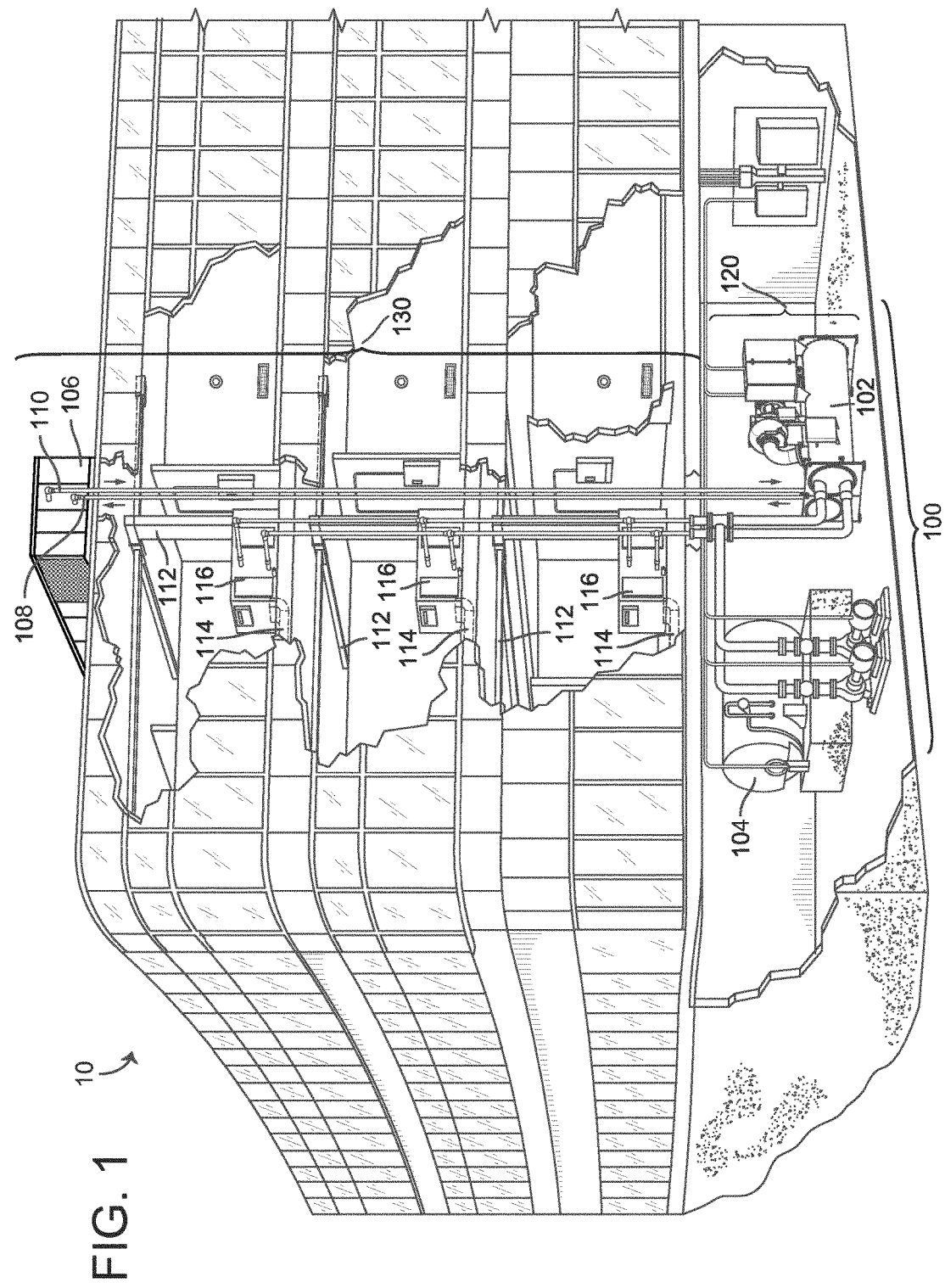
FIG. 1 is a drawing of a building equipped with a building management system (BMS), according to an exemplary embodiment.

Referring generally to the FIGURES, a building management system with near field communications (NFC) tags for monitoring and controlling building equipment is shown, according to various exemplary embodiments. The system includes a NFC tag located within a building space, a temperature sensor configured to measure a temperature of the building space, and a controller configured to control the temperature of the building space. In some embodiments, the system includes a plurality of NFC tags. Each NFC tag may be located at a different position within or around a building (e.g., inside rooms or zones, at entrance/exit points, in hallways, etc.) and may be associated with a particular building space. The associations between NFC tags and building spaces may be managed by the building management system. Each NFC tag stores a tag identifier (ID) uniquely identifying the NFC tag.

A mobile device reads an NFC tag and obtains the tag ID from the NFC tag via NFC. The mobile device then sends the tag ID to the controller. The controller receives the tag ID from the mobile device and uses the tag ID to determine the location of mobile device. For example, the controller may access a locations database which stores associations between tag IDs and building spaces. The controller may use the stored associations to identify a building space associated with the tag ID received from the mobile device. The controller may determine that the mobile device is located in the identified building space. In some embodiments, the locations database stores associations between building spaces and various sensors located within the building space. For example, the locations database may store an association between a particular building space and a temperature sensor that measures the temperature of the building space. The controller may identify the temperature sensor as being associated with the identified building space.

The controller may provide location-specific temperature measurements to the mobile device. Location-specific temperature measurements may include a temperature measured by the temperature sensor associated with the identified building space. In some embodiments, the controller provides other types of location-specific measurements to mobile device (e.g., pressure measurements, humidity measurements, oxygen level measurements, airflow measurements, etc.). In some embodiments, the controller provides a control interface to the mobile device. The control interface may include one or more of the measured values and/or setpoints associated with the identified building space. The control interface may be presented via a user interface of the mobile device.

A user views the temperature of the building space and adjusts the setpoint for the building space via the user interface of the mobile device. In some embodiments, the temperature of the building space is viewed using the control interface presented on the mobile device. The control interface may also display any other measured values associated with the building space and may identify the HVAC equipment used to control the measured values. In some embodiments, the control interface displays one or more setpoints for the building space. The control interface may allow the user to make adjustments to various setpoints for the building space and/or to control the HVAC equipment associated with the building space (e.g., by providing user input via the control interface). User input received via the control interface may be sent to the controller. The controller uses the adjusted setpoint to generate a control signal for the HVAC equipment. The HVAC equipment receives the control signal from the controller and provides heating/cooling to the building space to achieve the setpoint.

Advantageously, the control interface for a particular building space and/or item of building equipment may be automatically displayed on the mobile device in response to scanning or reading a NFC tag associated with the building space and/or the item of building equipment. This allows the user to monitor and control the building space/equipment without requiring the user to manually identify the building space/equipment or select the building space/equipment from a list. Furthermore, the control interface allows the user to monitor and control building equipment using the mobile device without requiring the building equipment to have its own onboard user interface. Additional features and advantages of the building management system are described in greater detail below.

Building Management System and HVAC System

Referring now to FIGS. 1-4, an exemplary building management system (BMS) and HVAC system in which the systems and methods of the present invention may be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes an HVAC system 100. HVAC system 100 may include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which may be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 may be located in or around building 10 (as shown in FIG. 1) or at an offsite location such as a central plant (e.g., a chiller plant, a steam plant, a heat plant, etc.). The working fluid may be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 may be transported to AHU 106 via piping 108.

AHU 106 may place the working fluid in a heat exchange relationship with an airflow passing through AHU 106 (e.g., via one or more stages of cooling coils and/or heating coils). The airflow may be, for example, outside air, return air from within building 10, or a combination of both. AHU 106 may transfer heat between the airflow and the working fluid to provide heating or cooling for the airflow. For example, AHU 106 may include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 may include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 may include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Figure 2:
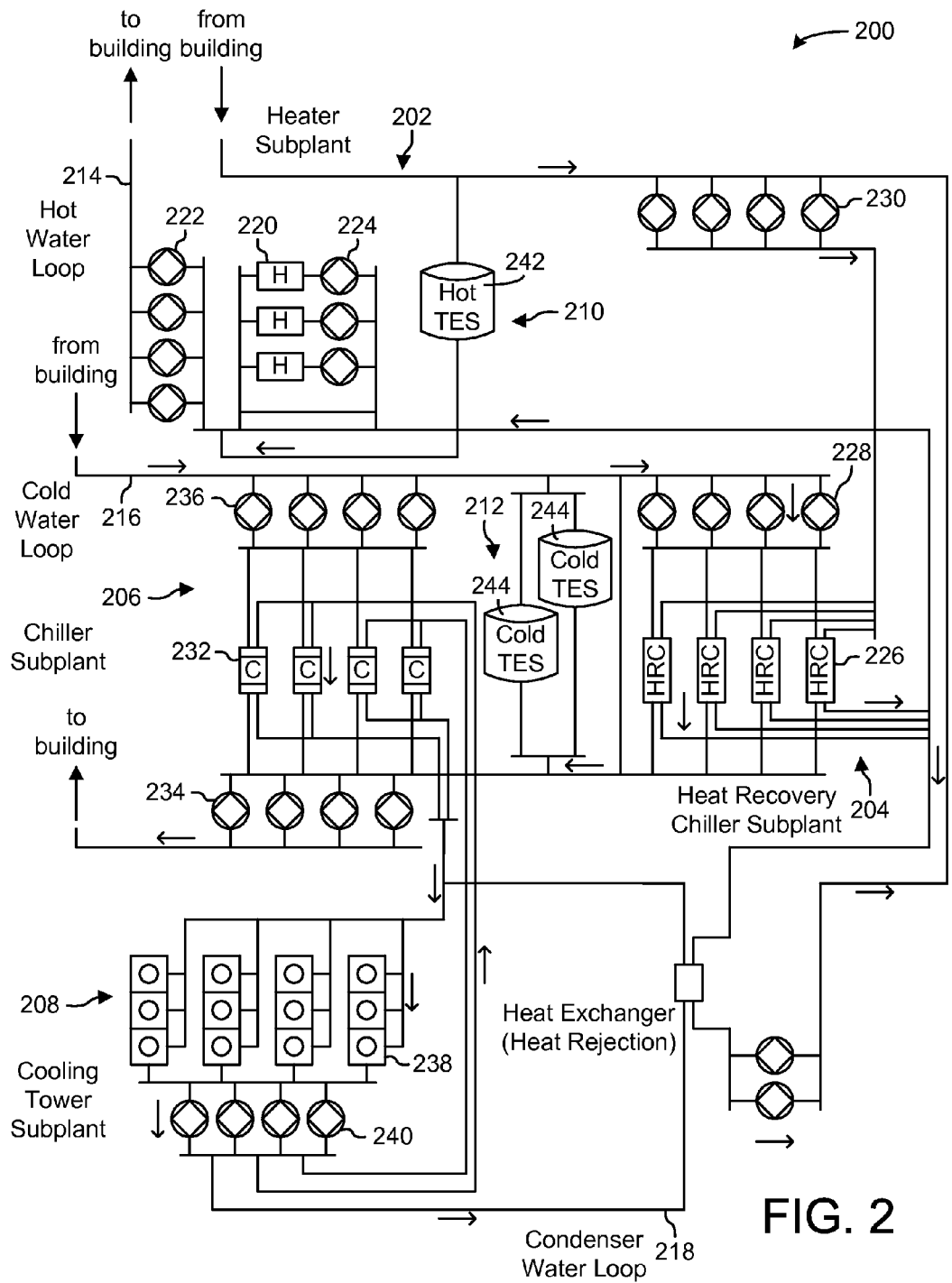
FIG. 2 is a schematic diagram of a waterside system which may be used to provide heating and/or cooling to the building of FIG. 1, according to an exemplary embodiment.

Referring now to FIG. 2, a block diagram of a waterside system 200 is shown, according to an exemplary embodiment. In various embodiments, waterside system 200 may supplement or replace waterside system 120 in HVAC system 100 or may be implemented separate from HVAC system 100. When implemented in HVAC system 100, waterside system 200 may include a subset of the HVAC devices in HVAC system 100 (e.g., boiler 104, chiller 102, pumps, valves, etc.) and may operate to supply a heated or chilled fluid to AHU 106. The HVAC devices of waterside system 200 may be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 may be configured to heat water in a hot water loop 214 that circulates the hot water between heater subplant 202 and building 10. Chiller subplant 206 may be configured to chill water in a cold water loop 216 that circulates the cold water between chiller subplant 206 building 10. Heat recovery chiller subplant 204 may be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air may be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) may be used in place of or in addition to water to serve the thermal energy loads. In other embodiments, subplants 202-212 may provide heating and/or cooling directly to the building or campus without requiring an intermediate heat transfer fluid. These and other variations to waterside system 200 are within the teachings of the present invention.

Each of subplants 202-212 may include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves may be integrated with the pumps or positioned upstream or downstream of the pumps to control the fluid flows in waterside system 200. In various embodiments, waterside system 200 may include more, fewer, or different types of devices and/or subplants based on the particular configuration of waterside system 200 and the types of loads served by waterside system 200.

Figure 3:
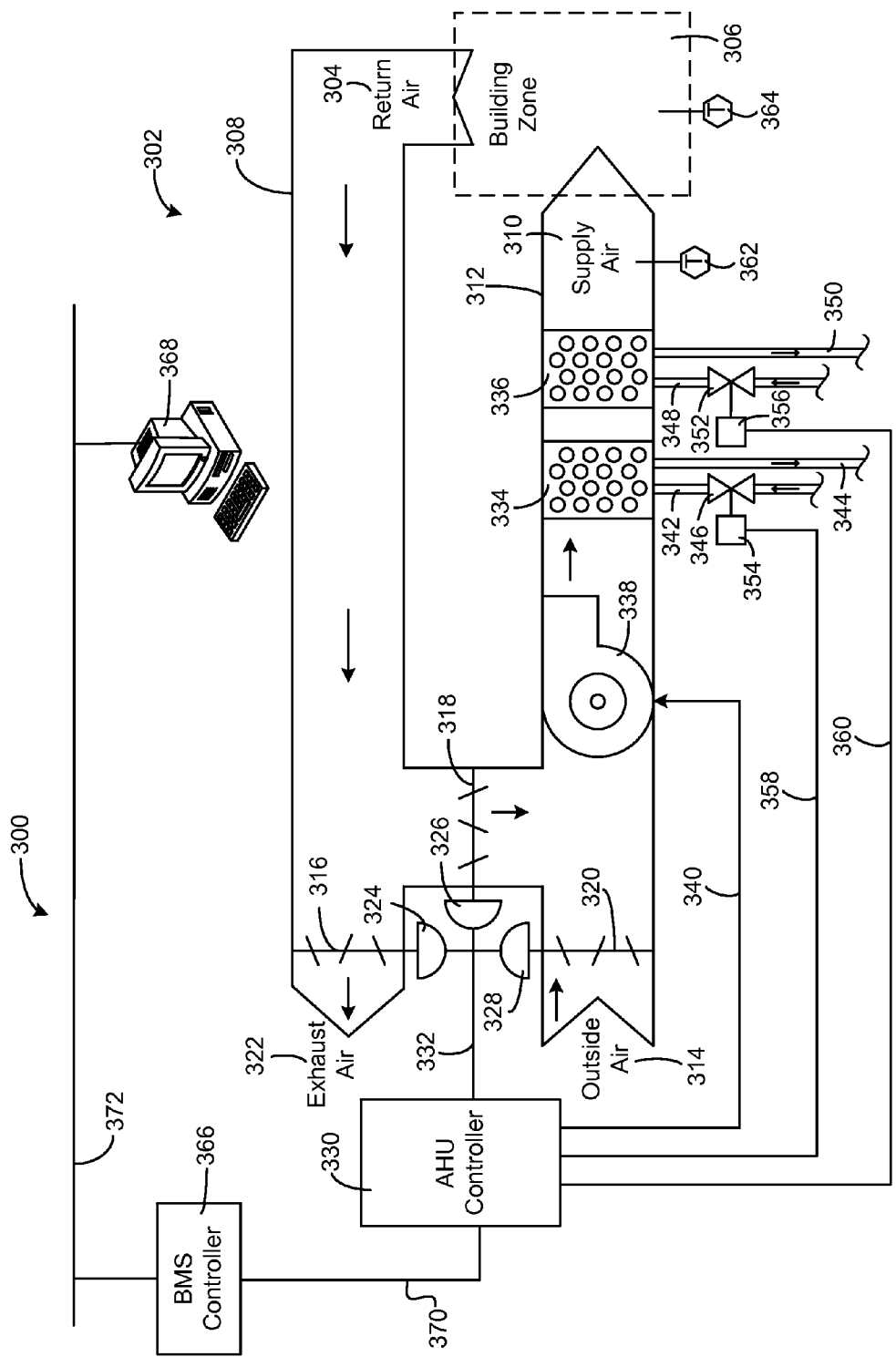
FIG. 3 is a block diagram of an airside system which may be used to provide heating and/or cooling to the building of FIG. 1, according to an exemplary embodiment.

Referring now to FIG. 3, a block diagram of an airside system 300 is shown, according to an exemplary embodiment. In various embodiments, airside system 300 may supplement or replace airside system 130 in HVAC system 100 or may be implemented separate from HVAC system 100. When implemented in HVAC system 100, airside system 300 may include a subset of the HVAC devices in HVAC system 100 (e.g., AHU 106, VAV units 116, ducts 112-114, fans, dampers, etc.) and may be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 may be configured to operate exhaust air damper 316, mixing damper 318, and outside air damper 320 to control an amount of outside air 314 and return air 304 that combine to form supply air 310. Any return air 304 that does not pass through mixing damper 318 may be exhausted from AHU 302 through exhaust damper 316 as exhaust air 322.

Each of dampers 316-320 may be operated by an actuator. For example, exhaust air damper 316 may be operated by actuator 324, mixing damper 318 may be operated by actuator 326, and outside air damper 320 may be operated by actuator 328. Actuators 324-328 may communicate with an AHU controller 330 via a communications link 332. Actuators 324-328 may receive control signals from AHU controller 330 and may provide feedback signals to AHU controller 330. Feedback signals may include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that may be collected, stored, or used by actuators 324-328. AHU controller 330 may be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 may be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 may be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 may be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 may be controlled by an actuator. For example, valve 346 may be controlled by actuator 354 and valve 352 may be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 may include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 may be separate (as shown in FIG. 3) or integrated. In an integrated implementation, AHU controller 330 may be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 may include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 may be a computer workstation, a client terminal, a remote or local interface, or any other type of user interface device. Client device 368 may be a stationary terminal or a mobile device. For example, client device 368 may be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Figure 4:
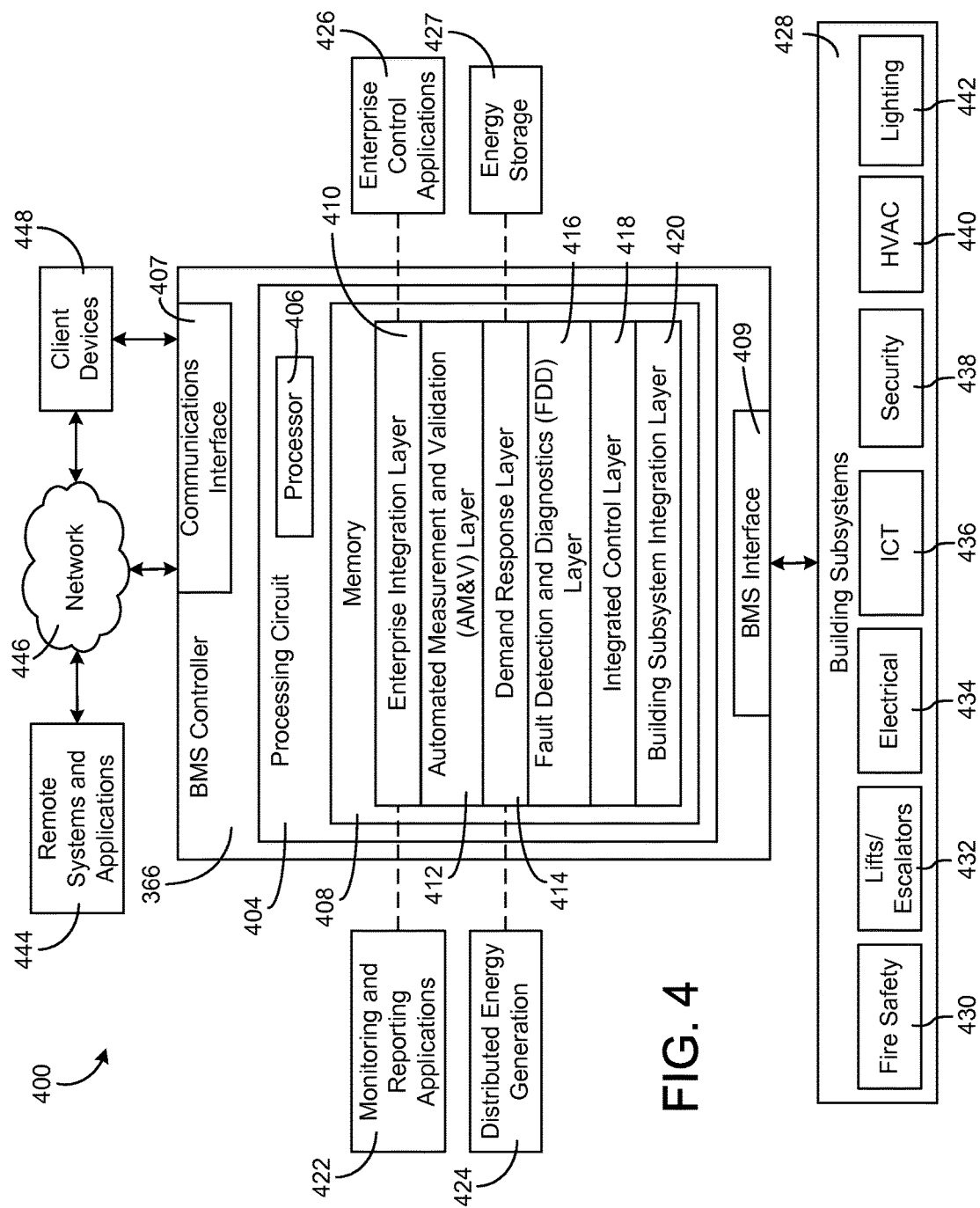
FIG. 4 is a block diagram of a BMS which may be used to monitor and control conditions within the building of FIG. 1, according to an exemplary embodiment.

Referring now to FIG. 4, a block diagram of a building management system (BMS) 400 is shown, according to an exemplary embodiment. BMS 400 may be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 may include any number of devices, controllers, and connections for completing its individual functions and control activities. HVAC subsystem 440 may include many of the same components as HVAC system 100, as described with reference to FIGS. 1-3. For example, HVAC subsystem 440 may include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 may include any number of light fixtures, ballasts, lighting sensors, dimmers, or other devices configured to controllably adjust the amount of light provided to a building space. Security subsystem 438 may include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 may be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a WiFi transceiver for communicating via a wireless communications network. In another example, one or both of interfaces 407, 409 may include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 may be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 408 may be or include volatile memory or non-volatile memory. Memory 408 may include database components, object code components, script components, or any other type of information structure for supporting the various activities and information structures described in the present application. According to an exemplary embodiment, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 may be distributed across multiple servers or computers (e.g., that can exist in distributed locations). Further, while FIG. 4 shows applications 422 and 426 as existing outside of BMS controller 366, in some embodiments, applications 422 and 426 may be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 may be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 may be configured to serve clients or local applications with information and services to support a variety of enterprise-level applications. For example, enterprise control applications 426 may be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 may be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 may be configured to optimize resource usage (e.g., electricity use, natural gas use, water use, etc.) and/or the monetary cost of such resource usage in response to satisfy the demand of building 10. The optimization may be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers may include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to an exemplary embodiment, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models may include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions may be edited or adjusted by a user (e.g., via a graphical user interface) so that the control actions initiated in response to demand inputs may be tailored for the user's application, desired comfort level, particular building equipment, or based on other concerns. For example, the demand response policy definitions can specify which equipment may be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 may be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In an exemplary embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 may be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 may be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 may be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 may be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 may be configured to provide calculated inputs (e.g., aggregations) to these higher levels based on outputs from more than one building subsystem.

Automated measurement and validation (AM&V) layer 412 may be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 may be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 may be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults may include providing an alert message to a user, a maintenance scheduling system, or a control algorithm configured to attempt to repair the fault or to work-around the fault.

FDD layer 416 may be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to an exemplary embodiment, FDD layer 416 (or a policy executed by an integrated control engine or business rules engine) may shut-down systems or direct control activities around faulty devices or systems to reduce energy waste, extend equipment life, or assure proper control response.

FDD layer 416 may be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 may include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Monitoring and Controlling Building Equipment

Figure 5A:
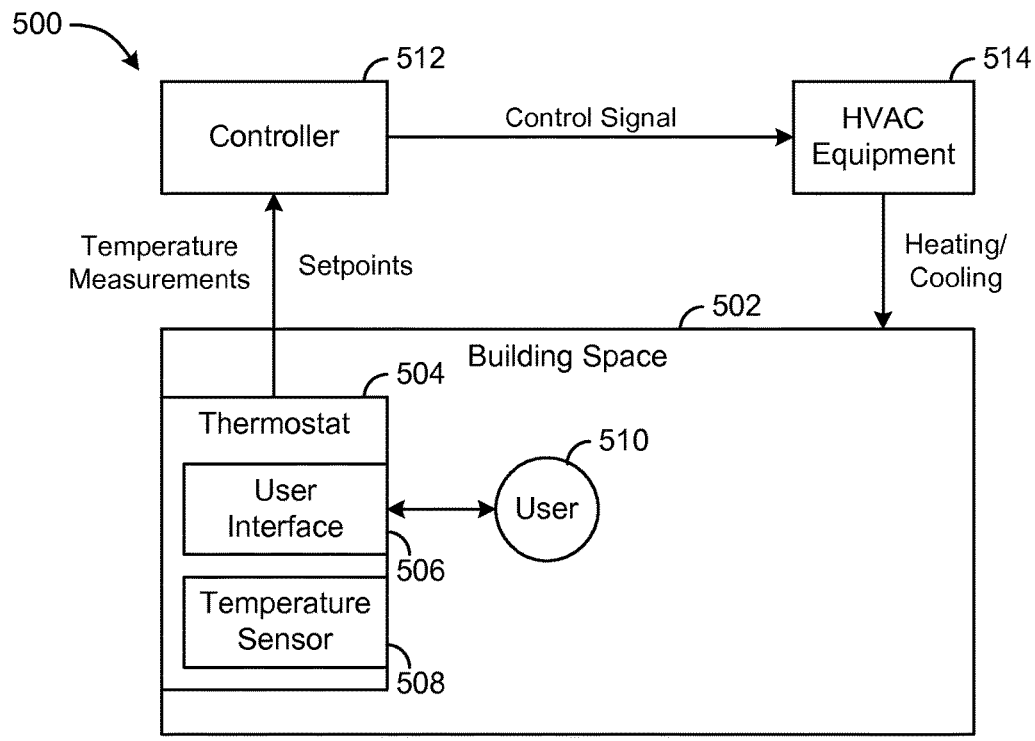
FIG. 5A is a block diagram of a prior art system for controlling the temperature of a building space using a wall-mounted thermostat, according to an exemplary embodiment.

Referring now to FIG. 5A, a prior art system 500 for monitoring and controlling the temperature of a building space is shown, according to an exemplary embodiment. System 500 is shown to include a thermostat 504 installed within a building space 502. Typically, thermostat 504 is mounted on a wall within building space 502. Thermostat 504 is shown to include user interface 506 and a temperature sensor 508. User interface 506 includes an electronic display for presenting information to a user 510 and one or more physical input devices (e.g., a rotary knob, pushbuttons, manually-operable switches, etc.) for receiving input from a user 510. Temperature sensor 508 measures the temperature of building space 502 and provides the measured temperature to user interface 506.

Thermostat 504 communicates with a controller 512. In various embodiments, controller 512 may be integrated with thermostat 504 or may exist as a separate controller (e.g., a field and equipment controller, a supervisory controller, etc.) that receives input from thermostat 504. Thermostat 504 may send temperature measurements and user-defined temperature setpoints to controller 512. Controller 512 uses the temperature measurements and the setpoints to generate a control signal for HVAC equipment 514. The control signal causes HVAC equipment 514 to provide heating and/or cooling for building space 502.

In system 500, thermostat 504 is used to monitor and control the temperature of building space 502. To monitor the temperature of building space 502, user 510 is required to move to the location of thermostat 504 and view the measured temperature via user interface 506. To control the temperature of building space 502, user 510 adjusts the temperature setpoint via user interface 506. The temperature setpoint may be sent from thermostat 504 to controller 512 and used by controller 512 to generate the control signal for HVAC equipment 514.

Figure 5B:
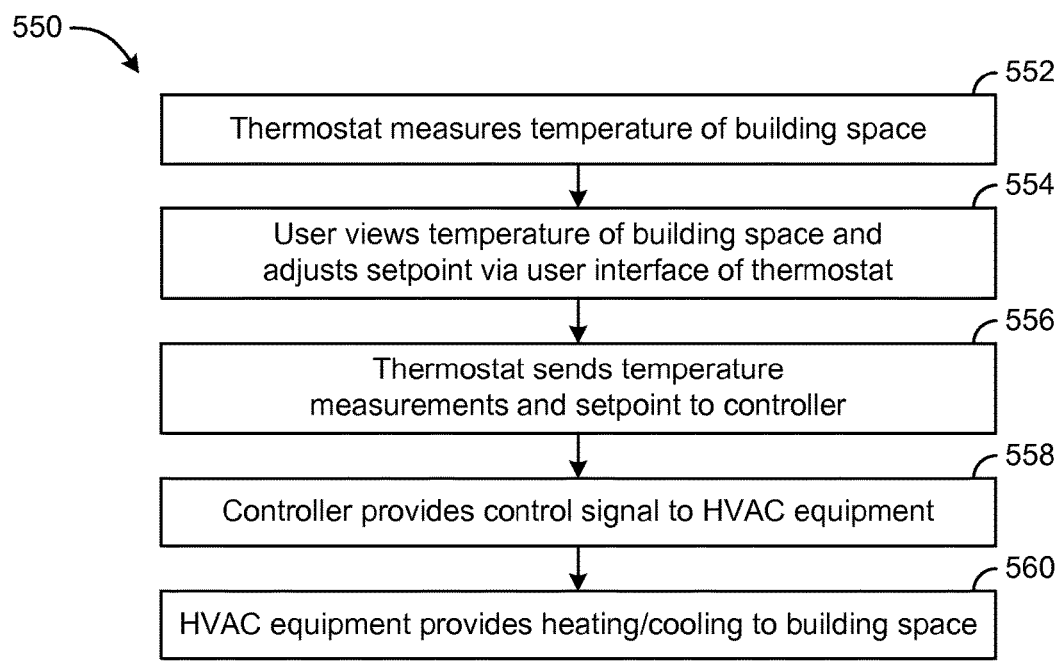
FIG. 5B is a flowchart of a prior art process for controlling the temperature of a building space using a wall-mounted thermostat, according to an exemplary embodiment.

Referring now to FIG. 5B, a prior art process 550 for monitoring and controlling the temperature of a building space is shown, according to an exemplary embodiment. Process 550 may be performed by system 500, as described with reference to FIG. 5A. In process 550, thermostat 504 measures the temperature of building space 502 (step 552). User 510 views the measured temperature and adjusts the temperature setpoint via user interface 506 of thermostat 504 (step 554). Thermostat 504 sends the measured temperature and the setpoint to controller 512 (step 556). Controller 512 uses the measured temperature and the setpoint to generate and provide a control signal to HVAC equipment 514 (step 558). HVAC equipment 514 operates in accordance with the control signal to provide heating/cooling to building space 502 (step 560).

Figure 6A:
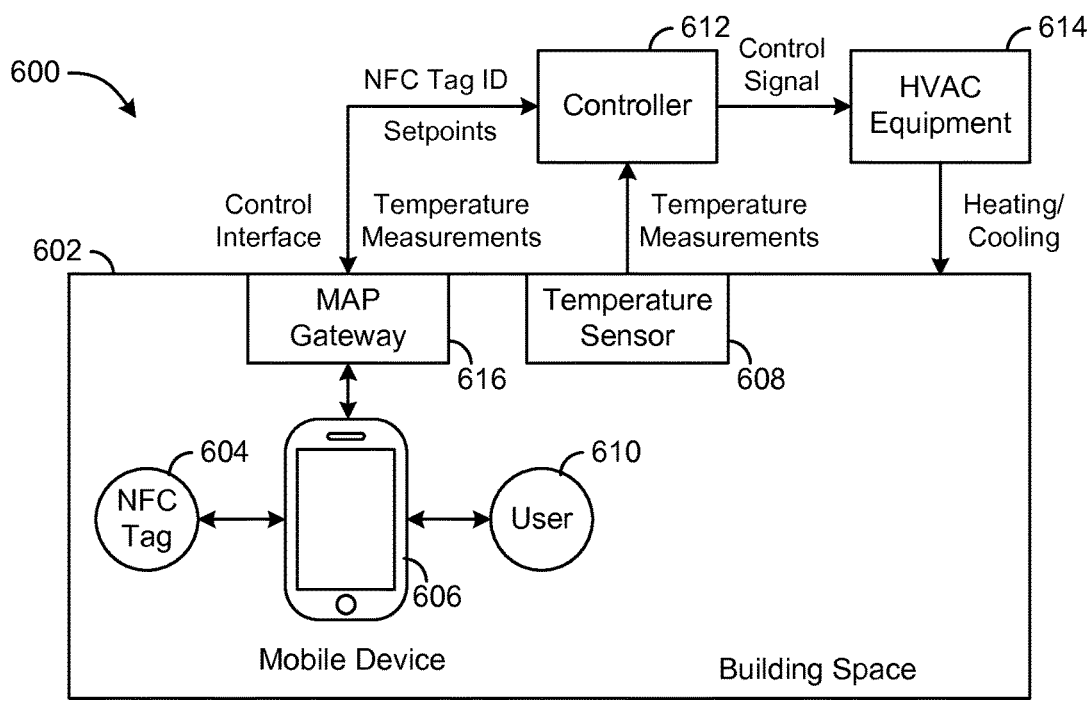
FIG. 6A is a block diagram of a system for monitoring and controlling building equipment using near field communication (NFC) tags which may be implemented in the building of FIG. 1, according to an exemplary embodiment.

Referring now to FIG. 6A, an improved system 600 for monitoring and controlling building equipment is shown, according to an exemplary embodiment. System 600 is shown to include a near filed communications (NFC) tag 604 within a building space 602. In some embodiments, system 600 includes a plurality of NFC tags 604. Each NFC tag 604 may be located at a different position within or around a building (e.g., inside rooms or zones, at entrance/exit points, in hallways, etc.) and may be associated with a particular building space 602. The associations between NFC tags 604 and building spaces 602 may be managed by the BMS (e.g., stored in a locations database accessible to controller 612).

In some embodiments, NFC tags 604 are passive NFC devices that do not require a continuous power source to operate. Advantageously, this allows NFC tag 604 to be located anywhere within building space 602. For example, NFC tag 604 may be attached to furniture within building space 602 (e.g., attached to a user's desk or cabinet), mounted on a wall, integrated with building equipment, or otherwise positioned to allow user 610 to easily access NFC tag 604. NFC tag 604 may have a relatively small size (e.g., approximately 4 cm by 4 cm) and may include an adhesive surface to facilitate securing NFC tag 604 to any object within building space 602.

Each NFC tag 604 may be associated with a different tag identifier (ID). Tag IDs may include, for example, a universally unique identifier (UUID) such as a MAC address, a SSID, a hash value (e.g., MD5, SHA-1, etc.), a random string, a device name, a serial number, or any other identifier capable of distinguishing different NFC tags 604 from each other. In some embodiments, each NFC tag 604 is associated with multiple different tag IDs. NFC tag 604 may be configured to send its tag ID to mobile device 606 when NFC tag 604 is scanned or read by mobile device 606.

NFC tags 604 may be configured to communicate with mobile device 606 using NFC. NFC is a contactless proximity technology that facilitates secure unidirectional and bidirectional communications. In some embodiments, NFC tags 604 use radio frequency identification (RFID) to communicate with mobile device 606. NFC tags 604 may use any of a variety of operating frequencies and/or data transfer speeds. In an exemplary embodiment, NFC tags 604 have an operating frequency of approximately 13.56 MHz and a data transfer speed of approximately 848 kbps. NFC tags 604 may have an operating range of approximately 10 cm or 4 inches. NFC tags 604 may be configured to communicate using any of a variety of communications protocols and/or communications standards (e.g., ISO/IEC 18092, ISO/IEC 21481, ISO/IEC 14443 A/B, ISO/IEC 45693, ISO/IEC 18000-3m3, etc.) and may be compatible with MIFARE and FELICA NFC products.

In some embodiments, each NFC tag 604 has an internal memory configured to store data written to NFC tag 604. The internal memory may store tag-specific data such as the tag ID and/or the service history of NFC tag 604. In some embodiments, the internal memory stores a location of NFC tag 604 within the building. NFC tags 604 may be reconfigured by writing new data to the internal memory. In some embodiments, NFC tags 604 can be programmed or configured any number of times. For example, NFC tag 604 may be reconfigured to have a different tag ID and/or a different stored location if NFC tag 604 is moved to a different location within the building.

Although the present invention is described as using NFC tags 604, it is contemplated that NFC tags 604 may be replaced or supplemented with any other type of wireless emitter configured to use any of a variety of wireless technologies or communications protocols. The wireless emitters may be configured to emit, receive, sense, relay, or otherwise engage in unidirectional or bidirectional wireless communications. For example, in various embodiments, NFC tags 604 may include or may be replaced with Bluetooth low energy (BLE) emitters, WiFi transceivers, RFID devices, ultrawide band (UWB) devices, infrared emitters/sensors, visible light communications (VLC) devices, ultrasound devices, cellular transceivers, or any other type of hardware configured to facilitate wireless data communications.

Still referring to FIG. 6A, system 600 is shown to include a temperature sensor 608, a controller 612, and HVAC equipment 614. Temperature sensor 608 may be located within building space 602 and configured to measure the temperature of building space 602. Temperature sensor 608 may provide temperature measurements to controller 612. In some embodiments, temperature sensor 608 is a resistance-based temperature sensor such as a thermistor or a resistance thermometer. In other embodiments, temperature sensor 608 is a thermocouple or any other type of temperature measurement device.

In some embodiments, system 600 includes a plurality of temperature sensors 608. Each temperature sensor 608 may be located at a different position within or around a building (e.g., inside rooms or zones, at entrance/exit points, in hallways, etc.) and may be associated with a particular building space 602. The associations between temperature sensors 608 and building spaces 602 may be managed by the BMS (e.g., stored in a locations database accessible to controller 612). In some embodiments, system 600 includes other types of sensors in addition to temperature sensors (e.g., pressure sensors, humidity sensors, lighting sensors, occupancy sensors, oxygen sensors, carbon dioxide sensors, airflow sensors, etc.). Each sensor may be located within and/or associated with a particular building space 602. Associations between the sensors and building spaces 602 may also be stored in a locations database accessible to controller 612.

Controller 612 may be configured to monitor and control conditions within building space 602. Controller 612 may be a field and equipment controller (FEC), a supervisory controller, a zone controller, or any other type of controller configured to monitor and control conditions within building space 602. Controller 612 may receive temperature measurements from temperature sensor 608 and/or other types of measurements from various sensors located within building space 602 (e.g., pressure measurements, humidity measurements, airflow measurements, etc.). Controller 612 may use closed loop control, feedback control, PI control, model predictive control, or any other type of automated building control methodology to control the environment (e.g., a variable state or condition) within building space 602. Controller 612 generates and provides a control signal to HVAC equipment 614.

HVAC equipment 614 may include any number and/or type of HVAC devices configured to provide heating and/or cooling for building space 602. For example, HVAC equipment 614 may include heaters, boilers, chillers, heat recovery chillers, cooling towers, air handling units, variable air volume units, dampers, fans, pumps, valves, or any other type of HVAC device. HVAC equipment 614 may include some or all of the equipment of HVAC system 100, waterside system 200, airside system 300, and/or HVAC subsystem 440, as described with reference to FIGS. 1-4. HVAC equipment 614 receives a control signal from controller 612 and operates to provide heating/cooling to building space 602 in accordance with the control signal.

Advantageously, system 600 does not require a thermostat for a user 610 to monitor and control conditions within building space 602, but rather provides a monitoring and control interface via mobile device 606. Mobile device 606 may include, for example, a smartphone, a tablet, a laptop computer, a portable communications device, or any other type of device that allows user 610 to interact with both NFC tag 604 and controller 612. Mobile device 606 may include a NFC transceiver configured to read NFC tag 604 and/or write data to NFC tag 604. Mobile device 606 may also include a WiFi transceiver, Bluetooth transceiver, or any other type of wireless transceiver configured to communicate with controller 612 using a wireless communications protocol (e.g., WiFi, Bluetooth, NFC, etc.). Mobile device 606 may be configured (e.g., by an application running on mobile device 606) to read the tag ID from NFC tag 604 and report the tag ID to controller 612.

In some embodiments, mobile device 606 communicates with controller 612 via a mobile applications portal (MAP) gateway 616. MAP gateway 616 may include a wireless access point, a wireless router, and/or one or more wireless transceivers (e.g., a WiFi transceiver, a Bluetooth transceiver, a NFC transceiver, a cellular transceiver, etc.) for communicating with mobile device 606 via a wireless data communications link. MAP gateway 616 can include any number of software buffers, queues, listeners, filters, translators, or other communications-supporting services. In some embodiments, MAP gateway 616 includes middleware components configured to facilitate interoperable communication to, from, or between controller 612 and various mobile devices 606 within building space 602. MAP gateway 616 may be connected to a communications network (e.g., a LAN, WAN, the Internet, a BACnet network, etc.) and may allow mobile device 606 to send and receive data via the communications network.

Figure 6B:
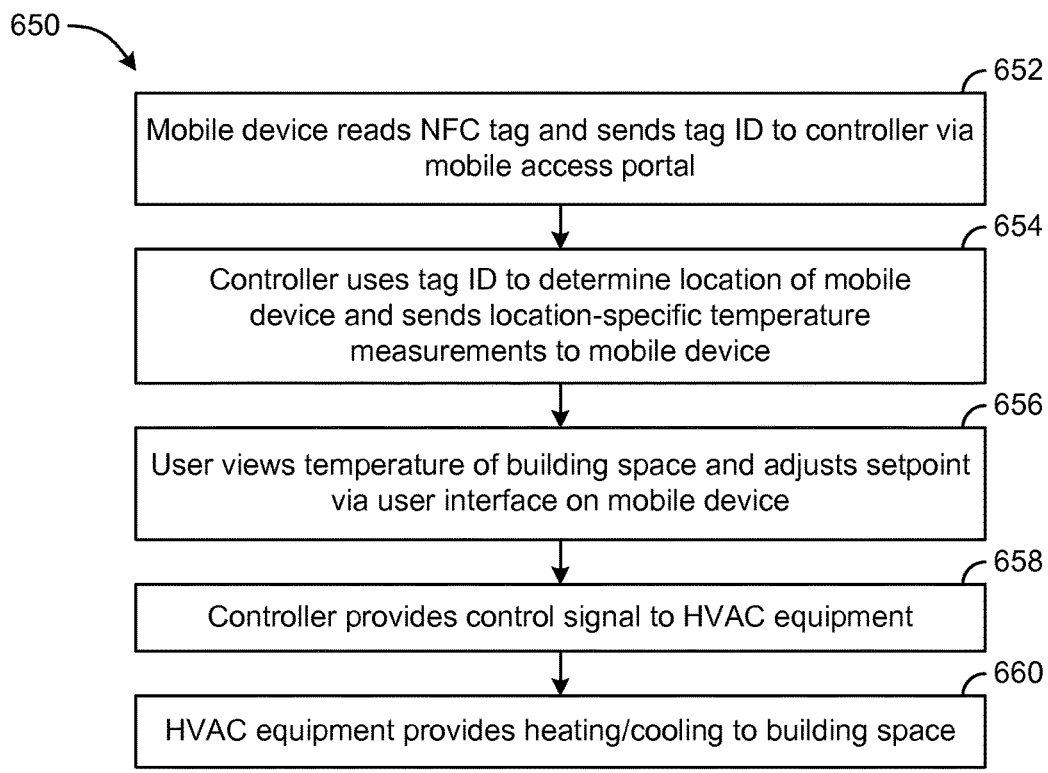
FIG. 6B is a flowchart of a process for monitoring and controlling building equipment using NFC tags which may be performed by the system of FIG. 6A, according to an exemplary embodiment.

Referring now to FIG. 6B, a process 650 for monitoring and controlling building equipment is shown, according to an exemplary embodiment. Process 650 may be performed by system 600, as described with reference to FIG. 6A. Advantageously, process 650 allows a user to monitor and control conditions within a building space without requiring the use of a conventional thermostat.

In process 650, mobile device 606 reads NFC tag 604 and sends the tag ID of NFC tag 604 to controller 612 (step 652). Reading NFC tag 604 may include communicating with NFC tag 604 using a NFC protocol. For example, user 610 can read NFC tag 604 by placing mobile device 606 in proximity to NFC tag 604 (e.g., tapping mobile device 606 on NFC tag 604). Mobile device 606 emits an electromagnetic field or signal that energizes NFC tag 604. When energized by mobile device 606, NFC tag 604 may emit a NFC signal that includes the tag ID of NFC tag 604. Mobile device 606 receives the NFC signal emitted by NFC tag 604 and identifies the tag ID. Mobile device 606 then sends the tag ID to controller 612 (e.g., via MAP gateway 616).

Controller 612 receives the tag ID from mobile device 606 and uses the tag ID to determine the location of mobile device 606 (step 654). Determining the location of mobile device 606 may include identifying a building space within which mobile device 606 is located. In some embodiments, controller 612 accesses a locations database that stores associations between tag IDs and building spaces. For example, the locations database may store an association between the tag ID of NFC tag 604 and the building space 602 within which NFC tag 604 is located. Controller 612 may identify the building space associated with the tag ID provided by mobile device 606 and determine that mobile device 606 is located within the identified building space 602. In some embodiments, the locations database stores associations between building spaces and various sensors located within the building space. For example, the locations database may store an association between building space 602 and temperature sensor 608. Controller 612 may identify sensor 608 as being associated with the identified building space 602.

Controller 612 may provide location-specific temperature measurements to mobile device 606 (step 654). Location-specific temperature measurements may include a temperature measured by the temperature sensor 608 associated with the identified building space 602. In some embodiments, controller 612 provides other types of location-specific measurements to mobile device 606 (e.g., pressure measurements, humidity measurements, oxygen level measurements, airflow measurements, etc.). In some embodiments, controller 612 provides a control interface to mobile device 606. The control interface may include one or more of the measured values and/or setpoints associated with the identified building space 602. The control interface may be presented via a user interface of mobile device 606.

User 610 views the temperature of building space 602 and adjusts the setpoint for building space 602 via the user interface of mobile device 606 (step 656). In some embodiments, the temperature of building space 602 is viewed using the control interface presented on mobile device 606. The control interface may also display any other measured values associated with building space 602 and may identify the HVAC equipment 614 used to control the measured values. In some embodiments, the control interface displays one or more setpoints for building space 602. The control interface may allow user 610 to make adjustments to various setpoints for building space 602 and/or to control the HVAC equipment 614 associated with building space 602 (e.g., by providing user input via the control interface). User input received via the control interface may be sent to controller 612.

Controller 612 uses the adjusted setpoint to generate a control signal for HVAC equipment 614 (step 658). HVAC equipment 614 receives the control signal from controller 612 and provides heating/cooling to building space 602 to achieve the setpoint (step 660).

Figure 7:
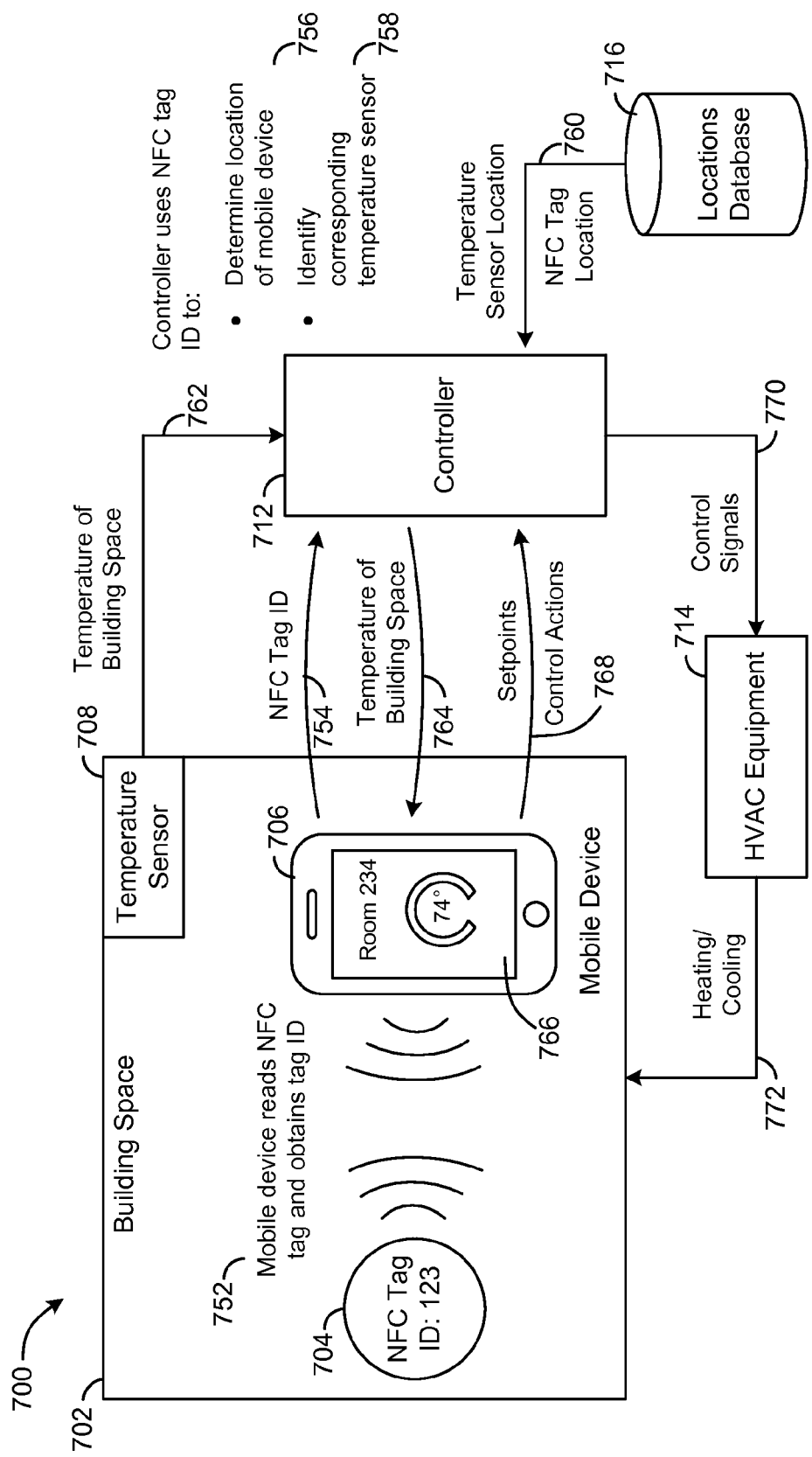
FIG. 7 is a block diagram of another system for monitoring and controlling building equipment using NFC tags which may be implemented in the building of FIG. 1, according to an exemplary embodiment.

Referring now to FIG. 7, another system 700 for monitoring and controlling building equipment is shown, according to an exemplary embodiment. System 700 is shown to include many of the same components of system 600. For example, system 700 is shown to include a building space 702, a NFC tag 704, a mobile device 706, a temperature sensor 708, a controller 712, and HVAC equipment 714, which may be the same or similar to the equivalent components of system 600, as described with reference to FIG. 6A.

System 700 is shown to further include a locations database 716. Locations database 716 may store associations between tag IDs and building spaces. For example, locations database 716 may store an association between the tag ID of NFC tag 704 and building space 702 within which NFC tag 704 is located. In some embodiments, locations database 716 stores associations between building spaces and various sensors located within the building space. For example, locations database may store an association between building space 702 and temperature sensor 708.

Still referring to FIG. 7, a process for monitoring and controlling building equipment is shown, according to an exemplary embodiment. Mobile device 706 reads NFC tag 704 and obtains the tag ID of NFC tag 704 (step 752). Mobile device 706 sends the tag ID of NFC tag 704 to controller 712 (step 754). Controller 712 uses the NFC tag ID to determine the location of mobile device 706 (step 756) and identify a corresponding temperature sensor (step 758). In some embodiments, controller determines the location of mobile device 706 and identifies a corresponding temperature sensor using information from locations database 716. For example, controller 712 may retrieve from locations database 716 an association between the tag ID of NFC tag 704 and building space 702 (step 760). Controller 712 may also retrieve from locations database 716 an association between building space 702 and temperature sensor 708 (step 760).

Controller 712 receives the temperature of building space 702 from temperature sensor 708 (step 762). Controller 712 may provide the temperature of building space 702 to mobile device 706 (step 764). In some embodiments, controller 712 provides the temperature of building space 702 to mobile device 706 as part of a control interface for monitoring and controlling conditions within building space 702. In some embodiments, controller 712 provides the temperature of building space 702 and/or the control interface to mobile device 706 in response to receiving the NFC tag ID from mobile device 706.

Mobile device 706 displays the temperature of building space 702 and/or the control interface via a user interface of mobile device 706 (step 766). The control interface may include user interface options for adjusting a setpoint for building space 702, controlling HVAC equipment 714 that serve building space 702, or otherwise specifying control actions for building space 702. Mobile device 706 provides the adjusted setpoints and/or control actions to controller 712 (step 768). Controller 712 uses the setpoints and/or control actions to generate control signals for HVAC equipment 714 and provides the control signals to HVAC equipment 714 (step 770). HVAC equipment 714 operates in accordance with the control signals to provide heating/cooling to building space 702 (step 772).

Figure 8:
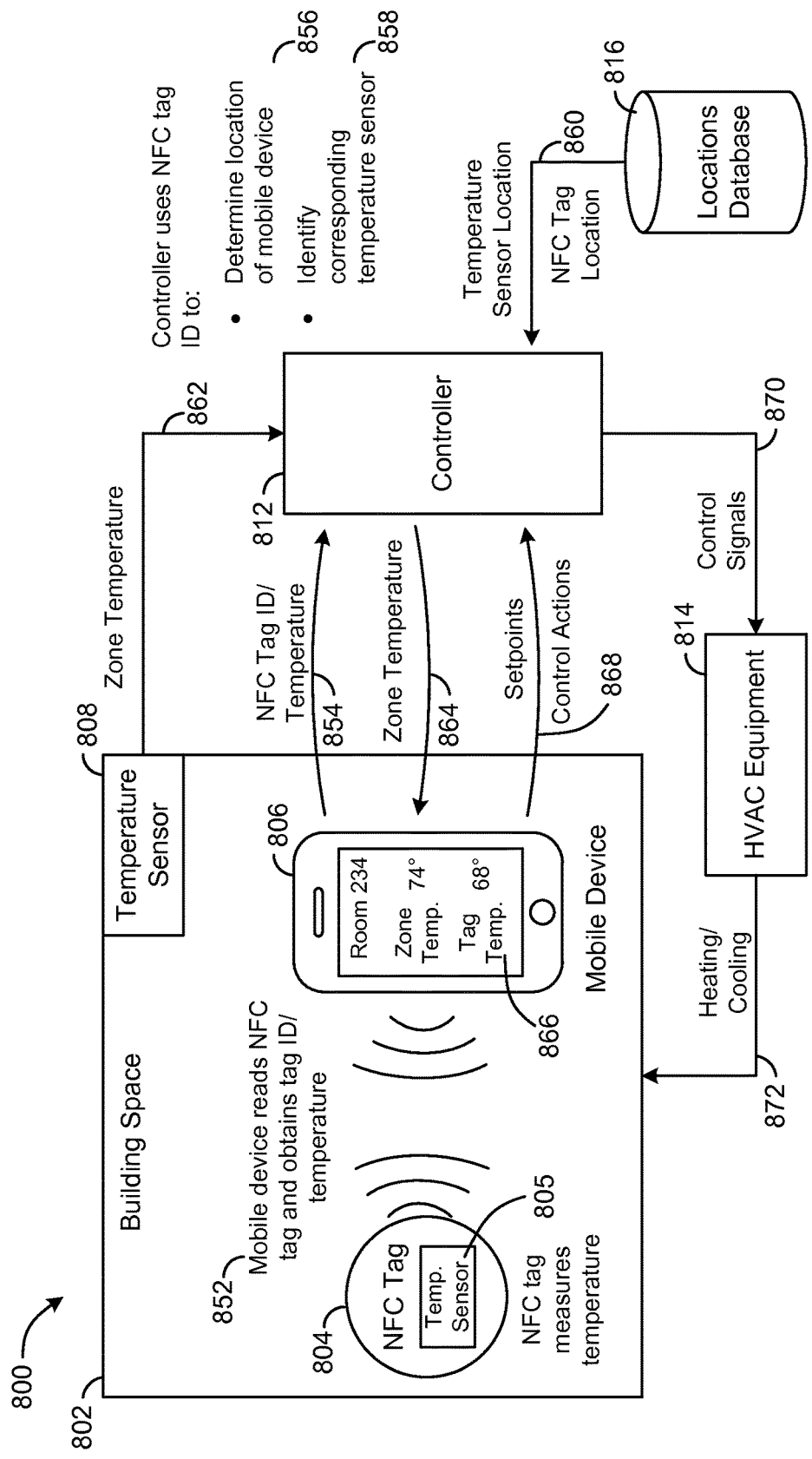
FIG. 8 is a block diagram of a system for monitoring and controlling building equipment using NFC tags in which the NFC tags include integrated temperature sensors, according to an exemplary embodiment.

Referring now to FIG. 8, another system 800 for monitoring and controlling building equipment is shown, according to an exemplary embodiment. System 800 is shown to include many of the same components of systems 600 and 700. For example, system 800 is shown to include a building space 802, a mobile device 806, a temperature sensor 808, a controller 812, HVAC equipment 814, and a locations database 816, which may be the same or similar to the equivalent components of systems 600 and 700, as described with reference to FIGS. 6A-7.

System 800 is shown to include a NFC tag 804. NFC tag 804 may include many of the same features of NFC tags 604 and 704. However, NFC tag 804 also includes an integrated temperature sensor 805. Temperature sensor 805 may be configured to measure the temperature at the location of NFC tag 804 (i.e., the tag temperature) when NFC tag 804 is energized by mobile device 806. NFC tag 804 may send the tag temperature to mobile device 806 via NFC (e.g., along with the NFC tag ID). Mobile device 806 may be configured to display the tag temperature along with the temperature measured by temperature sensor 808 (i.e., the zone temperature) via a user interface of mobile device 806.

In some instances, the tag temperature may differ from the zone temperature. For example, NFC tag 804 may be located in a sunny area of building space 802 (e.g., near a window), whereas temperature sensor 808 may be located in a shady area of building space 802 (e.g., near a doorway). Consequently, the tag temperature may be higher than the zone temperature. As another example, NFC tag 804 may be located near an air supply duct that supplies cold air to building space 802, whereas temperature sensor 808 may be located near an air return duct that returns warm air from building space 802 to an air handling unit. Consequently, the tag temperature may be lower than the zone temperature.

In some embodiments, NFC tag 804 is located proximate to a user within building space 802, whereas temperature sensor 808 is located further away from the user. For example, NFC tag 804 may be attached to furniture (e.g., a desk, a chair, a bed, etc.) currently being used by the user or may be a mobile temperature sensor carried by the user. NFC tag 804 may be configured to measure a temperature of building space 802 proximate to the user. Temperature sensor 808 may have a fixed location along a wall of building space 802 or any other location further away from the user. If NFC tag 804 is located closer to the user than temperature sensor 808, the tag temperature may be a more accurate measurement of the temperature that the user is experiencing relative to the zone temperature. Advantageously, the tag temperature can be used in place of or in addition to the zone temperature to control the temperature of building space 802.

In some embodiments, mobile device 806 sends the tag temperature to controller 812. Controller 812 may use the tag temperature to supplement or replace the zone temperature when generating control signals for building equipment 814. For example, controller 812 may calculate an average temperature for building space 802 using both the tag temperature and the zone temperature. Controller 812 may be configured to generate control signals for building equipment 814 to drive the average temperature to a temperature setpoint. In some embodiments, controller 812 uses the tag temperature as a replacement for the zone temperature. For example, mobile device 806 may present a user interface that allows a user to specify whether to override the zone temperature with the tag temperature. If the user chooses to override the zone temperature with the tag temperature, controller 812 may use the tag temperature in place of the zone temperature to generate control signals for building equipment 814.

In some embodiments, controller 812 uses the tag temperature to establish a temperature profile for building space 802. The temperature profile may describe a distribution of temperatures throughout building space 802 relative to the zone temperature measured by temperature sensor 808. For example, controller 812 may compare the tag temperature to the zone temperature to determine an amount by which the tag temperature exceeds the zone temperature (e.g., +2° C.) or an amount by which the tag temperature is less than the zone temperature (e.g., −2° C.). When a new temperature measurement is received from temperature sensor 808, controller 812 may estimate a corresponding tag temperature using the previously-determined temperature differential. In this way, controller 812 can estimate the tag temperature even when NFC tag 804 is not energized and is not providing a temperature measurement to controller 812.

Still referring to FIG. 8, a process for monitoring and controlling building equipment using a NFC tag with an integrated temperature sensor is shown, according to an exemplary embodiment. NFC tag 804 uses temperature sensor 805 to measure the tag temperature when NFC tag 804 is energized by mobile device 806 (step 850). Mobile device 806 reads NFC tag 804 and obtains the tag ID of NFC tag 804 and the tag temperature (step 852). Mobile device 806 sends the tag ID of NFC tag 804 and/or the tag temperature to controller 812 (step 854).

Controller 812 uses the NFC tag ID to determine the location of mobile device 806 (step 856) and identify a corresponding temperature sensor (step 858). In some embodiments, controller determines the location of mobile device 806 and identifies a corresponding temperature sensor using information from locations database 816. For example, controller 812 may retrieve from locations database 816 an association between the tag ID of NFC tag 804 and building space 802 (step 860). Controller 812 may also retrieve from locations database 816 an association between building space 802 and temperature sensor 808 (step 860).

Controller 812 receives the zone temperature from temperature sensor 808 (step 862). Controller 812 may provide the zone temperature to mobile device 806 (step 864). In some embodiments, controller 812 provides the zone temperature to mobile device 806 as part of a control interface for monitoring and controlling conditions within building space 802. In some embodiments, controller 812 provides the zone temperature and/or the control interface to mobile device 806 in response to receiving the NFC tag ID from mobile device 806.

Mobile device 806 displays the zone temperature, the tag temperature, and/or the control interface via a user interface of mobile device 806 (step 866). The control interface may include user interface options for adjusting a setpoint for building space 802, controlling HVAC equipment 814 that serve building space 802, or otherwise specifying control actions for building space 802. Mobile device 806 provides the adjusted setpoints and/or control actions to controller 812 (step 868). Controller 812 uses the setpoints and/or control actions to generate control signals for HVAC equipment 814 and provides the control signals to HVAC equipment 814 (step 870). In some embodiments, controller 812 uses the tag temperature to generate the control signals for HVAC equipment 814. HVAC equipment 814 operates in accordance with the control signals to provide heating/cooling to building space 802 (step 872).

Figure 9:
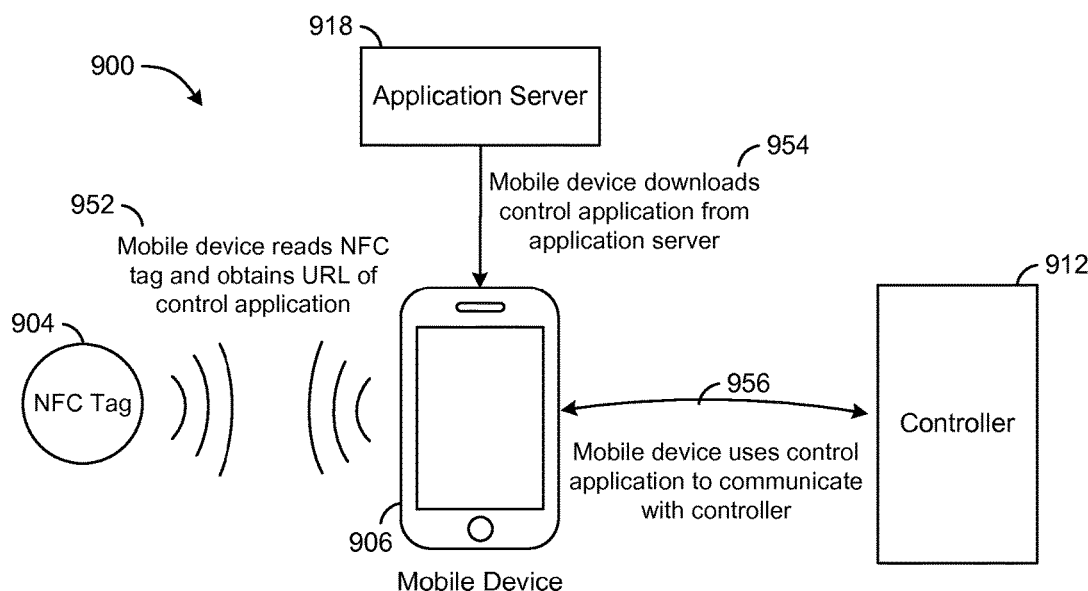
FIG. 9 is a block diagram of a system for facilitating interactions between mobile devices and building equipment in which a mobile device uses information from a NFC tag to download a control application from an application server, according to an exemplary embodiment.

Referring now to FIG. 9, a system 900 for facilitating communications between mobile devices and building equipment is shown, according to an exemplary embodiment. System 900 is shown to include many of the same components of systems 600-800. For example, system 900 is shown to include a NFC tag 904, a mobile device 906, and a controller 912, which may be the same or similar to the equivalent components of systems 600-800, as described with reference to FIGS. 6A-8.

System 900 is shown to include an application server 918. Application server 918 may be configured to store and provide applications that can be run by mobile device 906. In some embodiments, application server 918 is an Internet-based service such as an application store through which applications can be downloaded by mobile device 906. In other embodiments, application server 918 is a local server (e.g., within a building LAN) accessible to mobile device 906.

Application server 918 may provide mobile device 906 with a control application that can be used by mobile device 906 to interact with controller 912. In some embodiments, the control application reads information from controller 912 and generates a control interface for monitoring and controlling controller 912. In some embodiments, the control application translates information between a format or language used by controller 912 and a format in which the information can be displayed to a user via mobile device 906. The control application may allow mobile device 906 to communicate with controller 912 and to provide setpoints and/or control actions to controller 912.

In some embodiments, mobile device 906 obtains the information required to download the control application from NFC tag 904. For example, NFC tag 904 may store a URL, IP address, database location, or other information that can be used by mobile device 906 to determine the location of the control application. When NFC tag 904 is scanned or read by mobile device 906, NFC tag 904 may provide the URL of the control application to mobile device 906 (step 952). Mobile device 906 may use the URL provided by NFC tag 904 to download the control application from application server 918 (step 954). Mobile device 906 then installs and runs the control application and uses the control application to communicate with controller 912 (step 956). In other embodiments, mobile device 906 obtains the information required to download the control application from another data source (i.e., other than NFC tag 904).

Application server 918 may provide mobile device 906 with a tag reader application that can be used by mobile device 906 to obtain certain types of information from NFC tag 904. For example, the tag reader application may specify a particular NFC protocol used by NFC tag 904 to communicate the tag ID and/or temperature measurements (e.g., the ISO 15693 protocol). In some embodiments, NFC tag 904 provides mobile device 906 with the download location of the tag reader application using a first NFC protocol that mobile device 906 is already configured to understand (e.g., the NFC data exchange format). Once the tag reader application is installed and run by mobile device 906, mobile device 906 may communicate with NFC tag 904 using a second NFC protocol (e.g., ISO 15693) to obtain the tag ID and/or temperature measurements. Advantageously, using a second NFC protocol and/or a specialized tag reader application to communicate certain types of information between NFC tag 904 and mobile device 906 ensures that the information remains secure.

Figure 10:
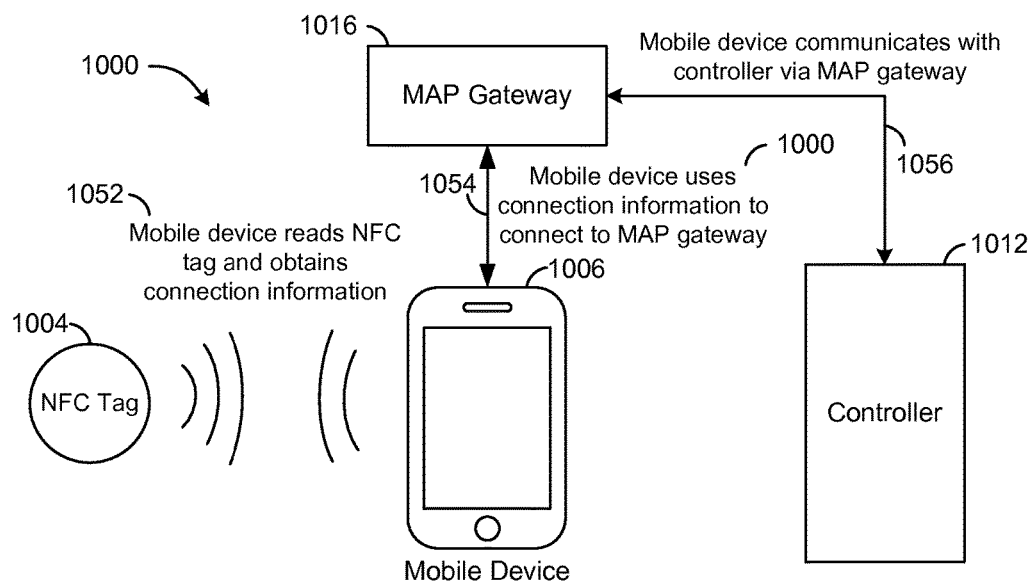
FIG. 10 is a block diagram of a system for facilitating interactions between mobile devices and building equipment in which the mobile device obtains access credentials for a wireless network from a NFC tag, according to an exemplary embodiment.

Referring now to FIG. 10, a system 1000 for facilitating communications between mobile devices and building equipment is shown, according to an exemplary embodiment. System 1000 is shown to include many of the same components of systems 600-900. For example, system 1000 is shown to include a NFC tag 1004, a mobile device 1006, a controller 1012, and a MAP gateway 1016, which may be the same or similar to the equivalent components of systems 600-900, as described with reference to FIGS. 6A-9.

In some embodiments, MAP gateway 1016 provides a secure wireless network that requires mobile device 1006 to provide login credentials before the wireless network can be accessed or used by mobile device 1006. For example, MAP gateway 1016 may operate using a secure WiFi network that requires mobile device 1006 to provide a SSID and passphrase before mobile device 1006 is allowed to connect to the network. In some instances, the SSID may be hidden and not broadcast by MAP gateway 1016. Once connected to the wireless network, MAP gateway 1016 may require mobile device 1006 to provide additional credentials (e.g., a username and a password) to access and/or communicate with controller 1012.

NFC tag 1004 may be configured to provide mobile device 1006 with login credentials (e.g., SSID, passphrase, username, password, etc.) that can be used by mobile device 1006 to connect to MAP gateway 1016 and communicate with controller 1012. The login credentials may be provided via NFC communication between NFC tag 1004 and mobile device 1006. For example, when NFC tag 1004 is read by mobile device 1006, NFC tag 1004 may provide mobile device 1006 with connection information and other login credentials (step 1052). Mobile device 1006 may use the connection information to connect to MAP gateway 1016 (step 1054). Mobile device 1006 may then use the other login credentials to access and communicate with controller 1012 (step 1056). Advantageously, providing the connection information and other login credentials via NFC ensures that the information remains secure (e.g., by requiring mobile device 1006 to within NFC range of NFC tag 1004) and prevents an unauthorized party from obtaining the information from a remote location.

Figure 11A:
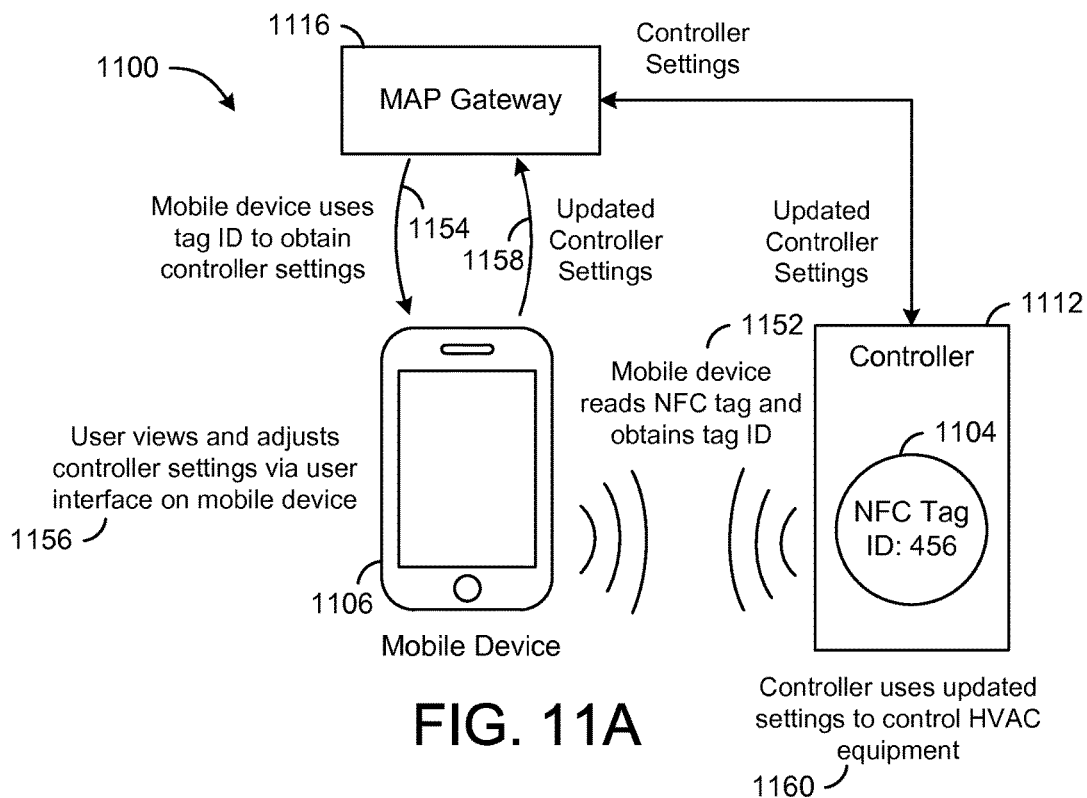
FIG. 11A is a block diagram of a system for monitoring and controlling building equipment in which a mobile device uses a NFC tag to identify a particular item of building equipment, according to an exemplary embodiment.
Figure 11B:
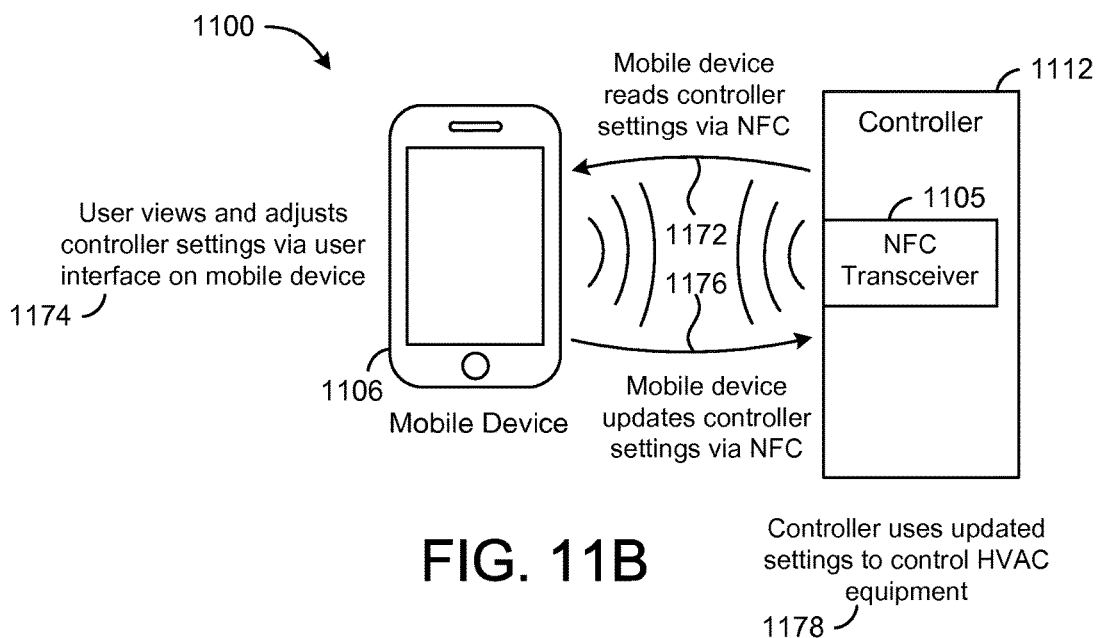
FIG. 11B is a block diagram of a system for monitoring and controlling building equipment in which a mobile device uses NFC to communicate with the building equipment, according to an exemplary embodiment.

Referring now to FIGS. 11A-11B, another system 1100 for facilitating communications between mobile devices and building equipment is shown, according to an exemplary embodiment. System 1100 is shown to include many of the same components of systems 600-1000. For example, system 1100 is shown to include a NFC tag 1104, a mobile device 1106, a controller 1112, and a MAP gateway 1116, which may be the same or similar to the equivalent components of systems 600-1000, as described with reference to FIGS. 6A-10.

In FIG. 11A, controller 1112 is shown to include a NFC tag 1104. NFC tag 1104 may be integrated with controller 1112 (e.g., located inside a controller housing) or attached to controller 1112 (e.g., via an adhesive surface). NFC tag 1104 has a tag ID and is configured to provide the tag ID to mobile device 1106 when NFC tag 1104 is read by mobile device 1106. Mobile device 1106 may use the tag ID to uniquely identify controller 1112 and to retrieve configuration parameters and other settings for controller 1112. Conventional controllers use dual in-line package (DIP) switches to configure the controller and establish an identity for the controller. Advantageously, the unique identity provided by NFC tag 1104 allows controller 1112 to be identified and configured without requiring DIP switches.

In some embodiments, system 1100 includes an associations database that stores associations between NFC tag IDs and HVAC devices (e.g., controllers, HVAC equipment, etc.). Mobile device 1106 may use the associations database to identify a particular controller 1112 associated with the tag ID obtained from NFC tag 1104. Once a particular controller 1112 associated with the tag ID has been identified, mobile device 1106 may retrieve configuration settings for the identified controller 1112 (e.g., from a settings database or from controller 1112 via map gateway 1116).

In some embodiments, mobile device 1106 displays a control interface that allows a user to view the configuration settings and other information associated with controller 1112. The control interface presented via mobile device 1106 may allow a user to interact with controller 1112 and may enable the user to view and modify the configuration settings for controller 1112 without requiring controller 1112 to have its own onboard user interface. In some embodiments, the control interface includes links to product manuals for controller 1112, a service history of controller 1112, maintenance information for controller 1112, or other information related to controller 1112.

As shown in FIG. 11A, mobile device 1106 may read NFC tag 1104 and obtain the tag ID from NFC tag 1104 via NFC (step 1152). Mobile device 1106 may use the tag ID to obtain controller settings (step 1154). Obtaining the controller settings may include accessing an associations database to identify a controller associated with the tag ID and retrieving controller settings for the identified controller. Controller settings may include any configurable setting or parameter that controller 1112 uses during operation. A user views and adjusts the controller settings via a user interface of mobile device 1106 (step 1156). Mobile device 1106 then sends the updated controller settings to controller 1112 via MAP gateway 1116 (step 1158). Controller 1112 uses the updated configuration settings to control HVAC equipment (step 1160).

Referring now to FIG. 11B, NFC tag 1104 may be replaced with a NFC transceiver 1105 in some embodiments. NFC transceiver 1105 may be configured to transmit configuration settings from controller 1112 to mobile device 1106 and to receive updated configuration settings from mobile device 1106 via NFC. For example, mobile device 1106 may read settings from controller 1112 via NFC (step 1172). A user views and adjusts the controller settings via a user interface of mobile device 1106 (step 1174). Mobile device 1106 then sends the updated controller settings to controller 1112 via NFC (step 1176). Controller 1112 uses the updated configuration settings to control HVAC equipment (step 1178).

Although a controller is shown in FIGS. 11A-11B, it is contemplated that NFC tags can be integrated with or attached to any type of building equipment (e.g., HVAC equipment, electrical equipment, security equipment, communications equipment, lighting equipment, etc.) or other items within a building. Each NFC tag stores a tag ID that can be read by a mobile device running a NFC tag reader application. The mobile device uses the tag ID to identify a particular item of building equipment associated with the tag ID (e.g., using a database that stores associations between tag IDs and items of building equipment). Once a particular item of building equipment is identified, the mobile device can retrieve current settings, product manuals, a service history, maintenance information, and/or other information related to the identified building equipment.

The mobile device may display a control interface that allows a user to view the retrieved information and make changes to the identified building equipment (e.g., changing settings, changing an operating state, turning on/off, etc.). Advantageously, the control interface for a particular item of building equipment may be automatically displayed on the mobile device in response to scanning or reading a NFC tag associated with the item of building equipment. This allows the user to monitor and control the building equipment without requiring the user to manually identify the building equipment or select the building equipment from a list. Additionally, the control interface allows the user to monitor and control the building equipment using the mobile device without requiring the building equipment to have its own onboard user interface.

Figure 12:
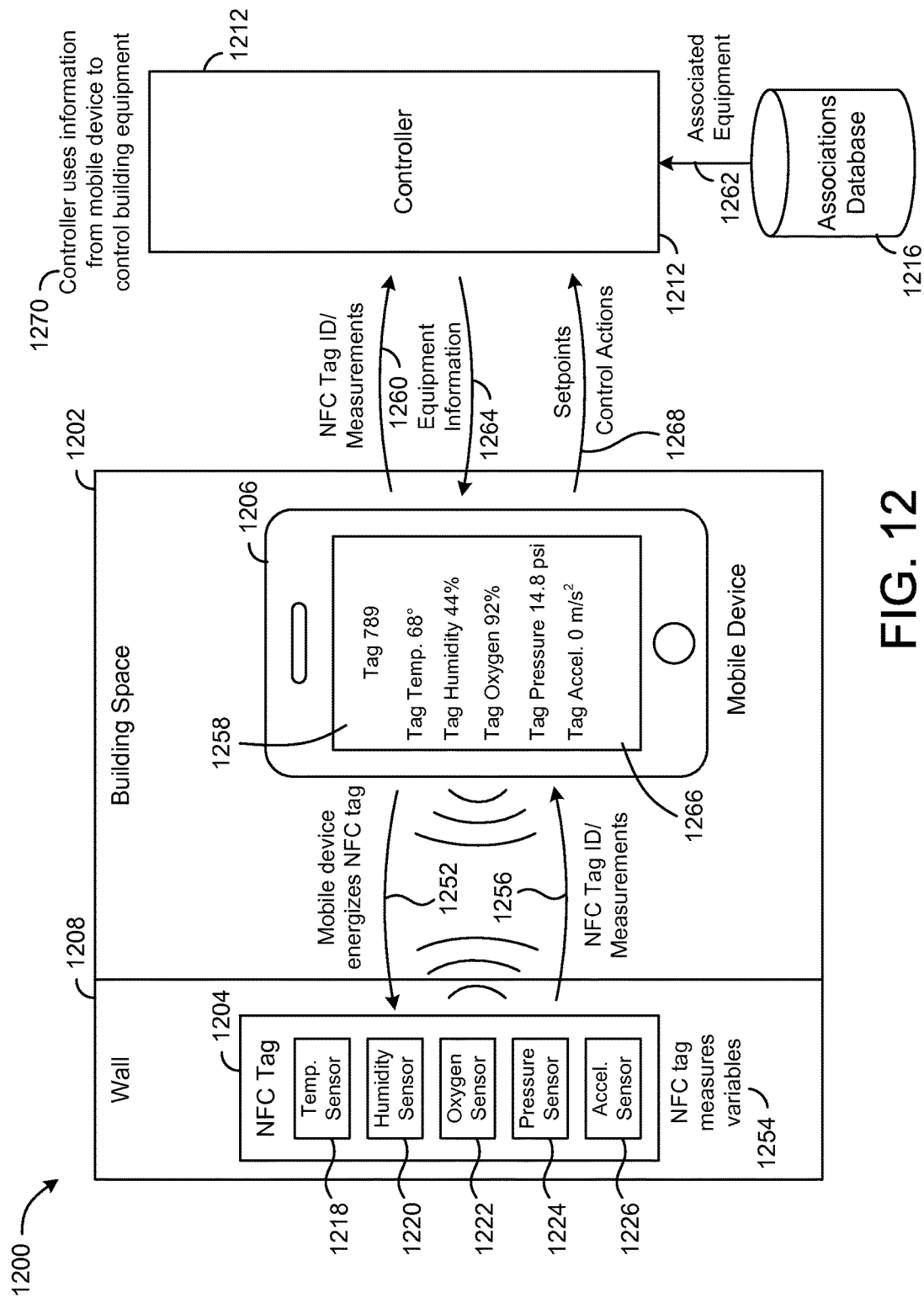
FIG. 12 is a block diagram of a system for monitoring and controlling building equipment using NFC tags in which the NFC tags include a variety of integrated sensors, according to an exemplary embodiment.

Referring now to FIG. 12, a system 1200 for monitoring and controlling building conditions is shown, according to an exemplary embodiment. System 1200 is shown to include many of the same components of systems 600-1100. For example, system 1200 is shown to include a building space 1202, a mobile device 1206, a controller 1212, and an associations database 1216, which may be the same or similar to the equivalent components of systems 600-1100, as described with reference to FIGS. 6A-11B.

System 1200 is shown to include a NFC tag 1204. NFC tag 1204 can be placed at any location within or around building space 1202 (e.g., within wall 1208, within a ceiling panel, attached to an object in building space 1202, integrated with building equipment, etc.) and may be configured to measure one or more variables at the location of NFC tag 1204. For example, NFC tag 1204 may include one or more integrated sensors (e.g., temperature sensor 1218, humidity sensor 1220, oxygen sensor 1222, pressure sensor 1224, accelerometer 1226, etc.) configured to measure one or more variables at the location of NFC tag 1204 (e.g., temperature, humidity, oxygen level, pressure, acceleration, etc.). Advantageously, NFC tag 1204 may report the measured variables to mobile device 1206 via NFC without requiring any physical power or data connections to tag 1204.

In some embodiments, NFC tag 1204 is a passive NFC device that receives energy from mobile device 1206 (step 1252). NFC tag 1204 may be configured to measure the one or more variables when NFC tag 1204 is energized by mobile device 1206 (step 1254). In some embodiments, NFC tag 1204 measures the one or more variables only when NFC tag 1204 is energized by mobile device 1206 and does not measure the one or more variables when NFC tag 1204 is not energized by mobile device 1206. NFC tag 1204 may send measured values for the one or more variables to mobile device 1206 via NFC (e.g., along with the NFC tag ID) (step 1256). Mobile device 1206 may be configured to display the measured values via a user interface of mobile device 1206 (step 1258).

In some embodiments, mobile device 1206 sends the measurements from NFC tag 1204 and the tag ID to controller 1212 (step 1260). Controller 1212 may use the NFC tag ID to identify building equipment and/or a building space associated with NFC tag 1204. For example, controller 1212 may access an associations database 1216 which stores associations between NFC tag IDS, building spaces, and/or building equipment. Controller 1212 may use the information from associations database 1216 to identify one or more items of building equipment and/or a building space associated with NFC tag 1204 (step 1262).

In some embodiments, controller 1212 retrieves information associated with the identified building equipment and/or building space. For example, controller 1212 may retrieve current settings, product manuals, a service history, maintenance information, and/or other information related to the identified building equipment. Controller 1212 may send the equipment information to mobile device 1206 for presentation via a user interface of mobile device 1206 (step 1264).

Mobile device 1206 may display a control interface that allows a user to view the retrieved information and make changes to the identified building equipment (e.g., changing settings, changing an operating state, turning on/off, etc.) (step 1266). For example, a user can change a setpoint or specify various control actions for the building equipment via the control interface. Mobile device 1206 sends the setpoints and other control actions to controller 1212 (step 1268). Controller 1212 may use the information from mobile device 1206 (e.g., measured values, setpoints, control actions, etc.) to generate control signals for the building equipment (step 1270).

NFC Tag Writer Application

Referring now to FIGS. 13A-13F, several user interfaces of a NFC tag writer application 1306 are shown, according to an exemplary embodiment. NFC tag writer application 1306 may run on a mobile device 1302 and may be used to read, write, and update various types of data stored on NFC tags. For example, NFC tag writer application 1306 may be configured to read and write tag IDs, equipment IDs, service history dates, or any other type of data or metadata that can be stored on a NFC tag 1304.

In some embodiments, NFC tag writer application 1306 is used to assign or reassign an identity to NFC tag 1304 in order to configure NFC tag 1304 to a particular zone or space. For example, NFC tag writer application 1306 may be used to store a URL of a particular data point on NFC tag 1304 (e.g., a temperature data point for a particular building space). When NFC tag 1304 is scanned by a mobile device running the control application, the mobile device may read the URL from NFC tag 1304 and retrieve the value of the data point identified by the URL (e.g., from a controller or a temperature sensor associated with the building space). If NFC tag 1304 is moved to a new or different building space, NFC tag writer application 1306 can be used to update the URL stored by NFC tag 1304 to associate NFC tag 1304 with a different data point (e.g., a temperature data point for the new building space).

In some embodiments, NFC tag writer application 1306 is used to store a service history in NFC tag 1304. For example, NFC tag may 1304 be associated with a particular article of building equipment (e.g., HVAC equipment, a controller, etc.) as described with reference to FIG. 11A. When the building equipment is serviced, NFC tag writer application 1306 can be used to store the service data within NFC tag 1304. NFC tag 1304 can then be read by a mobile device to retrieve the service history for the associated article of building equipment.

Figure 13A:
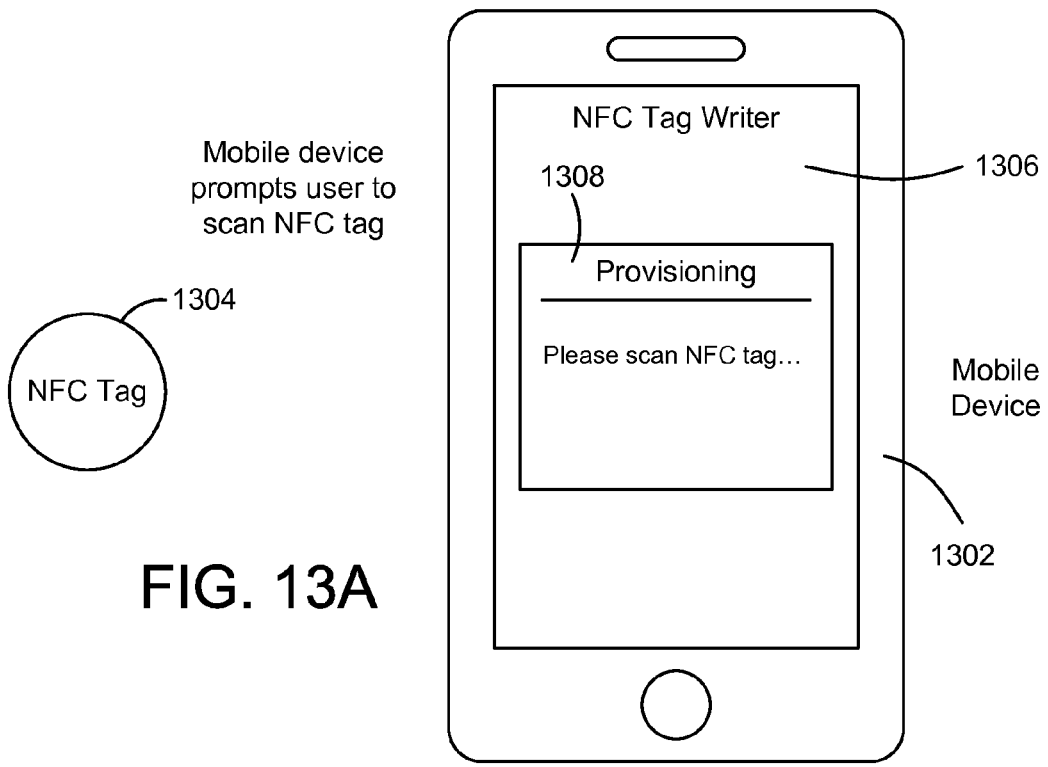
FIGS. 13A-13F are user interfaces of a NFC tag writer application which may be run by a mobile device to read, write, and reconfigure data stored on NFC tags, according to an exemplary embodiment.
Figure 13B:
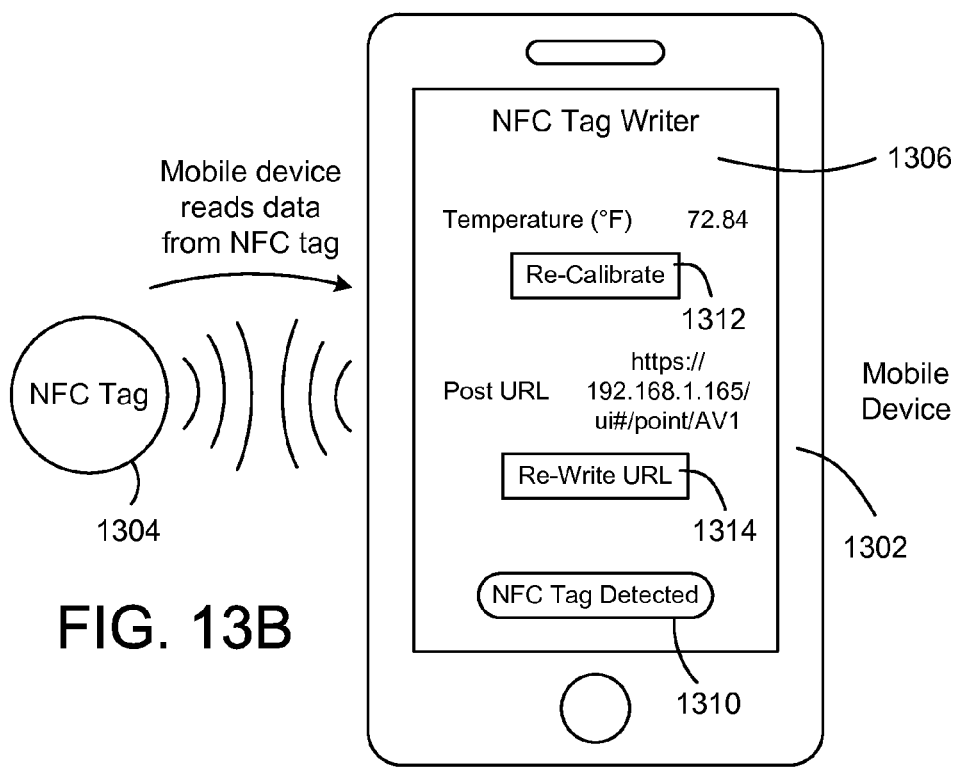

Referring particularly to FIGS. 13A-13B, NFC tag writer application 1306 may be configured to display a provisioning window 1308 (shown in FIG. 13A). Provisioning window 1308 may prompt a user to scan a NFC tag or to bring mobile device 1302 near a NFC tag. When mobile device 1302 is brought within range of NFC tag 1304, mobile device 1302 reads data from NFC tag 1304 (shown in FIG. 13B). In some embodiments, NFC tag writer application 1306 displays a notification 1310 that a NFC tag has been detected when mobile device 1302 is brought within range of NFC tag 1304. The data from NFC tag 1304 may include a post URL identifying a particular data point. For example, NFC tag writer application 1306 is shown displaying the post URL "https://192.168.1.165/ui#/point/AV1" in FIG. 13B. If NFC tag 1304 includes any integrated sensors, the data from NFC tag 1304 may further include one or more measured values (e.g., a measured temperature, a measured humidity, etc.). NFC tag writer application 1306 may include buttons 1312-1314 that can be selected to rewrite the post URL and/or recalibrate any integrated sensors.

Figure 13C:
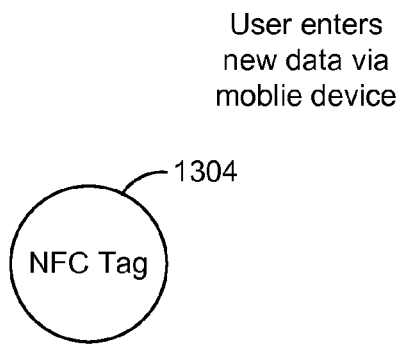
Figure 13C:
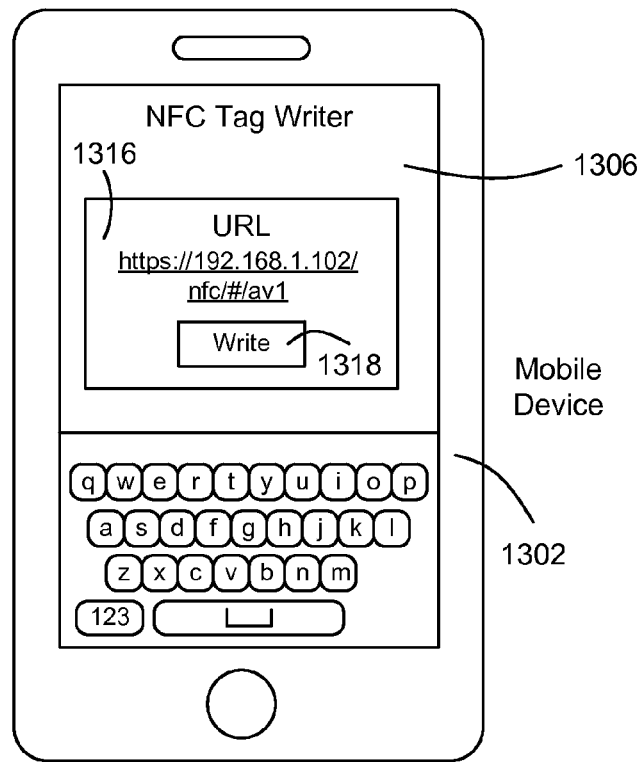
Figure 13D:
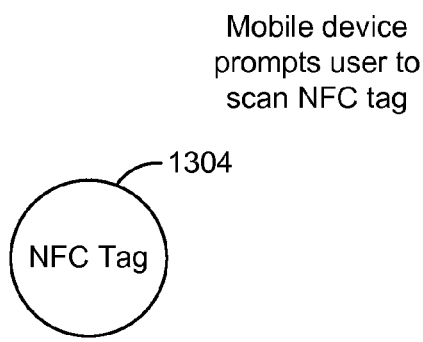
Figure 13D:
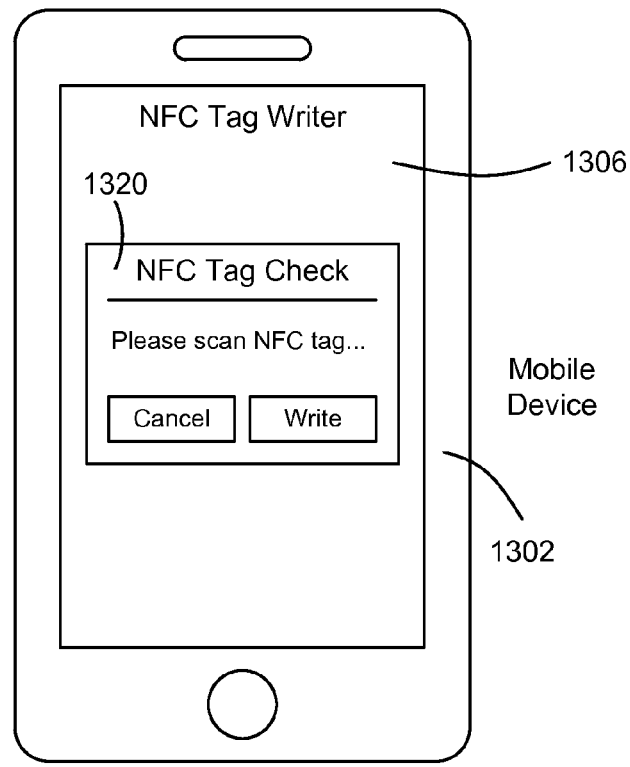

Referring now to FIGS. 13C-13D, NFC tag writer application 1306 may be configured to display a data input window 1316 (shown in FIG. 13C). Data input window 1316 may be displayed in response to a user selecting one or more of buttons 1312-1314. A user can enter a new value for the post URL or any other type of data stored on NFC tag 1304 via data input window 1316. For example, FIG. 13C shows data input window 1316 after a user has entered the text "http://192.168.1.102/nfc/#/av1" as a new value for the post URL. Data input window 1316 may include a selectable "write" button 1318 which can be selected once the new data has been fully entered. Selecting write button 1318 may close data input window 1316 and cause NFC tag writer application 1306 to display a NFC tag check window 1320 (shown in FIG. 13D). NFC tag check window 1320 may prompt the user to scan a NFC tag or to bring mobile device 1302 near a NFC tag.

Figure 13E:
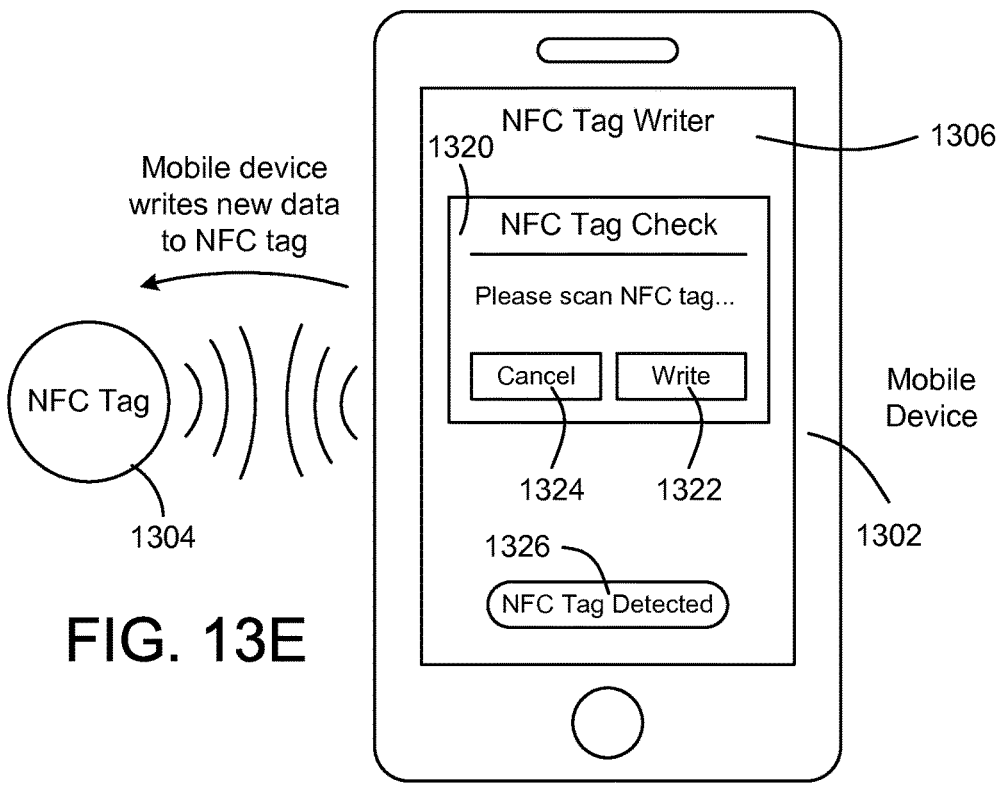
Figure 13F:
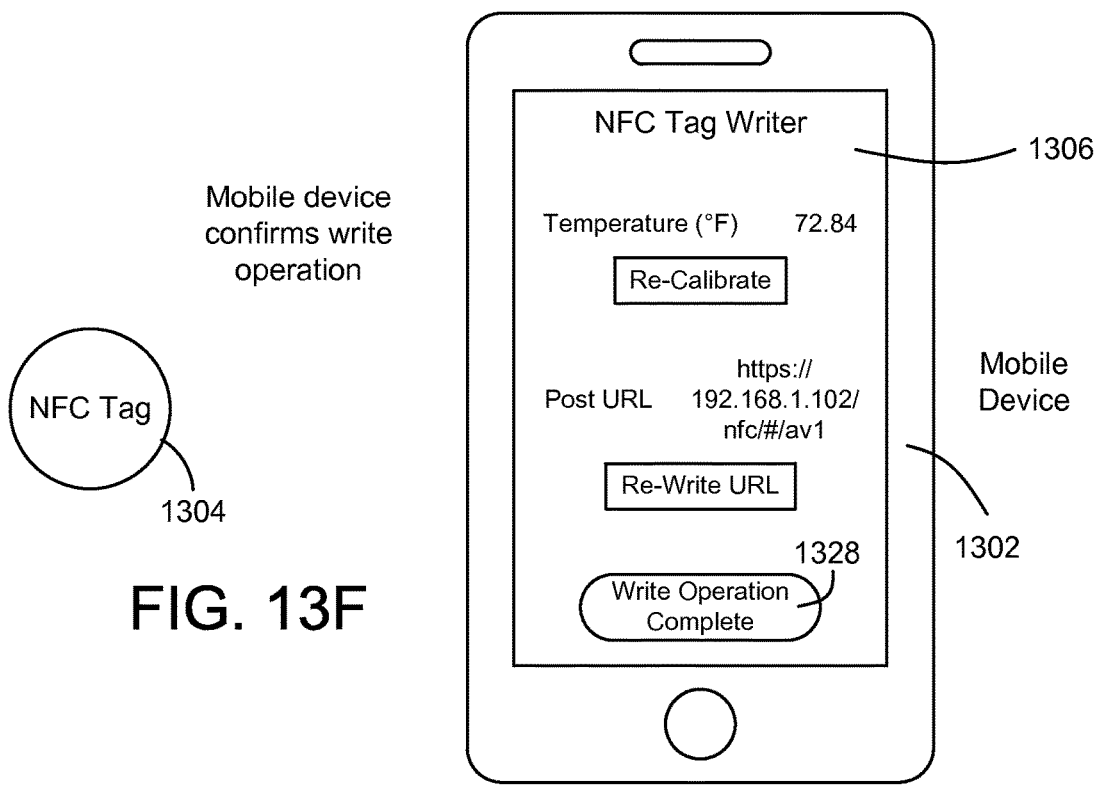

Referring now to FIGS. 13E-13F, NFC tag check window 1320 is shown to include a selectable "write" button 1322 and a selectable "cancel" button 1324. NFC tag writer application 1306 may be configured to display a notification 1326 that a NFC tag has been detected when mobile device 1302 is brought within range of NFC tag 1304. When mobile device 1302 is within range of NFC tag 1304, write button 1322 can be selected to write new data to NFC tag 1304 (shown in FIG. 13E). The new data written to NFC tag 1304 may include any data entered via data input window 1316 or any other data stored on mobile device 1302 (e.g., data from a controller, data received by another application running on mobile device 1302 or received from another data source, etc.). The new data may be communicated to NFC tag 1304 via NFC and stored on NFC tag 1304. In some embodiments, NFC tag writer application 1306 reads back the new data from NFC tag 1304 to confirm that the write operation was successful. NFC tag writer application 1306 may be configured to display a notification 1328 that the write operation was successful (shown in FIG. 13F). NFC tag writer application 1306 may display the new value for any data written to NFC tag 1304. For example, NFC tag writer application 1306 is shown displaying the new value for the post URL "http://192.168.1.102/nfc/#/av1" in FIG. 13F.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A system for monitoring and controlling building equipment associated with a building space, the system comprising:
   a near field communications (NFC) tag located within the building space and storing a tag ID uniquely identifying the NFC tag, wherein the NFC tag comprises an integrated temperature sensor configured to measure a temperature of the building space at a location of the NFC tag, the temperature measured by the integrated temperature sensor defining a measured tag temperature;
   a zone temperature sensor associated with the building space and configured to measure another temperature of the building space, the temperature measured by the zone temperature sensor defining a zone temperature;
   a mobile device configured to communicate with the NFC tag, wherein the mobile device reads the NFC tag and obtains the tag ID from the NFC tag via NFC, wherein the NFC tag provides the measured tag temperature to the mobile device via NFC when the mobile device reads the NFC tag; and
   a controller in communication with the mobile device, wherein the controller receives the tag ID from the mobile device and uses the tag ID to identify the zone temperature sensor associated with the building space, wherein the controller receives the zone temperature from the zone temperature sensor and provides the zone temperature to the mobile device;
   wherein the mobile device displays the zone temperature and the measured tag temperature via a user interface of the mobile device;
   wherein the mobile device sends the measured tag temperature to the controller and the controller uses the measured tag temperature to control the building equipment associated with the building space.

2. The system of claim 1, further comprising a control application running on the mobile device, wherein the control application displays the zone temperature and allows a user to adjust a setpoint for the zone temperature via the user interface of the mobile device;
   wherein the mobile device sends the adjusted setpoint to the controller and the controller uses the adjusted setpoint to control building equipment associated with the building space.

3. The system of claim 2, wherein the NFC tag stores a location of the control application and the mobile device obtains the location of the control location from the NFC tag via NFC;
   wherein the mobile device uses the location of the control application to download and install the control application, the control application configuring the mobile device to communicate with the controller.

4. The system of claim 1, further comprising a locations database storing an association between the tag ID and the building space in which the NFC tag is located;
   wherein the controller uses the stored association between the tag ID and the building space to determine that the mobile device is located within the building space.

5. The system of claim 4, wherein the locations database stores an association between the building space and the zone temperature sensor;
   wherein the controller uses the stored association between the building space and the zone temperature sensor to identify the zone temperature sensor associated with the building space.

6. The system of claim 1, wherein the NFC tag is a passive NFC tag that becomes energized by the mobile device when the mobile device reads the NFC tag;
   wherein the integrated temperature sensor measures the tag temperature in response to the NFC tag becoming energized by the mobile device.

7. The system of claim 1, wherein the NFC tag comprises one or more integrated sensors including at least one of a temperature sensor, a humidity sensor, an oxygen sensor, a pressure sensor, and an accelerometer;

wherein the NFC tag uses the one or more integrated sensors to measure at least one of a temperature, a humidity, an oxygen level, a pressure, and an acceleration at a location of the NFC tag when the NFC tag is energized by the mobile device.

8. The system of claim 1, wherein the NFC tag is located within a wall of the building space and comprises an integrated humidity sensor configured to measure a humidity within the wall when the NFC tag is energized by the mobile device;

wherein the NFC tag provides the measured humidity to the mobile device via NFC when the mobile device reads the NFC tag.

9. A system for monitoring and controlling building equipment associated with a building space, the system comprising:

a controller for the building equipment;

a near field communications (NFC) tag located within the building space and storing a location of a control application, wherein the NFC tag comprises an integrated temperature sensor configured to measure a temperature of the building space at a location of the NFC tag, the temperature measured by the integrated temperature sensor defining a measured tag temperature; and a mobile device configured to communicate with the NFC tag, wherein the mobile device reads the NFC tag and obtains the location of the control application, a tag ID uniquely identifying the NFC tag, and the measured tag temperature from the NFC tag via NFC;

wherein the controller receives the tag ID from the mobile device and uses the tag ID to identify a zone temperature sensor associated with the building space;

wherein the controller receives a measured temperature of the building space from the zone temperature sensor and provides the measured temperature of the building space to the mobile device;

wherein the mobile device uses the location of the control application to download and install the control application, the control application configuring the mobile device to communicate with the controller;

wherein the mobile device sends the measured tag temperature to the controller and the controller uses the measured tag temperature to control the building equipment associated with the building space.

10. The system of claim 9, wherein the mobile device uses the control application to adjust a setpoint for the controller and the controller uses the adjusted setpoint to control the building equipment associated with the building space.

11. The system of claim 10, wherein the NFC tag is configured to communicate using a first NFC protocol and a second NFC protocol;

wherein the mobile device obtains the location of the control application from the NFC tag using the first NFC protocol, the control application configuring the mobile device to communicate with the NFC tag using the second NFC protocol;

wherein the NFC tag stores additional information and provides the additional information to the mobile device when the mobile device reads the NFC tag using the second NFC protocol.

* * * * *